US011813561B2

(12) United States Patent
Buettner et al.

(10) Patent No.: US 11,813,561 B2
(45) Date of Patent: Nov. 14, 2023

(54) FILTRATION MEDIA, FILTER PACKS, AND FILTER ELEMENTS WITH PROTRUSIONS

(71) Applicant: Donaldson Company, Inc., Minneapolis, MN (US)

(72) Inventors: John M. Buettner, Stillwater, MN (US); Gregg T. Geiger, Excelsior, MN (US); Paul A. Way, Edina, MN (US)

(73) Assignee: Donaldson Company, Inc., Bloomington, MN (US)

(*) Notice: Subject to any disclaimer, the term of this patent is extended or adjusted under 35 U.S.C. 154(b) by 4 days.

(21) Appl. No.: 15/525,833

(22) PCT Filed: Nov. 10, 2015

(86) PCT No.: PCT/US2015/059943
§ 371 (c)(1),
(2) Date: May 10, 2017

(87) PCT Pub. No.: WO2016/077338
PCT Pub. Date: May 19, 2016

(65) Prior Publication Data
US 2018/0056226 A1    Mar. 1, 2018

Related U.S. Application Data

(60) Provisional application No. 62/188,003, filed on Jul. 2, 2015, provisional application No. 62/077,842, filed
(Continued)

(51) Int. Cl.
*B01D 46/52* (2006.01)
*B32B 5/22* (2006.01)
(Continued)

(52) U.S. Cl.
CPC ......... *B01D 46/523* (2013.01); *B01D 29/016* (2013.01); *B01D 29/11* (2013.01);
(Continued)

(58) Field of Classification Search
CPC ................ B01D 46/523; B01D 2201/127
See application file for complete search history.

(56) References Cited

U.S. PATENT DOCUMENTS 3,198,336 A * 8/1965 Hyslop ................. B01D 29/21
210/457
4,268,290 A    5/1981 Barrington
(Continued)

FOREIGN PATENT DOCUMENTS

DE    3815145 C1 * 10/1989 ........... B01D 29/016
DE    4217195    11/1993
(Continued)

OTHER PUBLICATIONS

"International Preliminary Report on Patentability," for PCT Application No. PCT/US2015/059943 dated May 26, 2017 (10 pages).
(Continued)

*Primary Examiner* — Jason M Greene
*Assistant Examiner* — Eric J McCullough
(74) *Attorney, Agent, or Firm* — Pauly, DeVries Smith & Deffner LLC

(57) ABSTRACT

Pleated filtration media, filtration media packs, and filtration elements containing projections are disclosed. The pleated filtration media includes projections on at least one surface, the projections configured to engage adjacent media sheets so as to reduce masking of the media. The pleated media and media pleat packs contain protrusions on the surface of the media. These protrusions are three dimensional structures that are on the surface of the media and are provided by forming the protrusion directly in the filtration media or applying structures, such as adhesive beads, or onto one or both faces of the media. Elongation of the adhesive bead can facilitate greater separation of the adjacent faces of pleated media if desired. These protrusions, also referred to herein as projections or dimples, can either contact each other or
(Continued)

contact flat media and keep adjacent media faces from becoming in intimate contact with each other.

17 Claims, 18 Drawing Sheets

Related U.S. Application Data on Nov. 10, 2014, provisional application No. 62/077,848, filed on Nov. 10, 2014.

(51) Int. Cl.

| | | |
|---|---|---|
| *B01D 39/00* | (2006.01) | |
| *B32B 3/30* | (2006.01) | |
| *B32B 5/26* | (2006.01) | |
| *B32B 5/02* | (2006.01) | |
| *B32B 5/08* | (2006.01) | |
| *B01D 46/24* | (2006.01) | |
| *B01D 29/01* | (2006.01) | |
| *B01D 29/11* | (2006.01) | |
| *B01D 39/10* | (2006.01) | |
| *B01D 39/18* | (2006.01) | |

(52) U.S. Cl.
CPC ............ *B01D 39/00* (2013.01); *B01D 39/10* (2013.01); *B01D 39/18* (2013.01); *B01D 46/2411* (2013.01); *B01D 46/522* (2013.01); *B32B 3/30* (2013.01); *B32B 5/022* (2013.01); *B32B 5/024* (2013.01); *B32B 5/08* (2013.01); *B32B 5/22* (2013.01); *B32B 5/26* (2013.01); *B01D 2201/12* (2013.01); *B01D 2201/127* (2013.01); *B01D 2239/0613* (2013.01); *B01D 2239/0618* (2013.01); *B01D 2279/60* (2013.01); *B32B 2262/02* (2013.01); *B32B 2262/062* (2013.01); *B32B 2262/101* (2013.01); *B32B 2262/103* (2013.01); *B32B 2262/105* (2013.01); *B32B 2262/14* (2013.01); *B32B 2307/726* (2013.01)

(56) References Cited

U.S. PATENT DOCUMENTS

| | | | |
|---|---|---|---|
| 5,613,992 A | | 3/1997 | Engel |
| 5,804,014 A | * | 9/1998 | Kahler ................... B01D 46/10 |
| | | | 156/227 |
| 6,039,778 A | | 3/2000 | Coulonvaux |
| 6,673,136 B2 | | 1/2004 | Gillingham et al. |
| 6,955,775 B2 | | 10/2005 | Chung et al. |
| 7,270,693 B2 | | 9/2007 | Chung et al. |
| 7,323,105 B1 | * | 1/2008 | Janikowski .......... B01D 46/523 |
| | | | 210/493.4 |
| 7,425,227 B1 | * | 9/2008 | Hutchison ............. B01D 46/10 |
| | | | 55/385.3 |
| 7,425,277 B1 | * | 9/2008 | Koemtzopoulos ......................... |
| | | | H01L 21/31116 |
| | | | 438/743 |
| 7,625,418 B1 | | 12/2009 | Choi |
| 7,661,540 B2 | | 2/2010 | Choi |
| 7,753,981 B2 | | 7/2010 | Kawano et al. |
| 8,663,426 B2 | * | 3/2014 | Fujiwara ................ B01D 39/18 |
| | | | 428/221 |
| 2002/0033224 A1 | | 3/2002 | Lippold et al. |
| 2005/0139544 A1 | * | 6/2005 | Choi .................. B01D 46/0001 |
| | | | 210/493.1 |
| 2006/0151383 A1 | | 7/2006 | Choi |
| 2007/0209343 A1 | | 9/2007 | Cuvelier et al. |
| 2014/0223872 A1 | | 8/2014 | Bao et al. |
| 2015/0128545 A1 | * | 5/2015 | Seeberger .......... B01D 67/0002 |
| | | | 264/103 |
| 2015/0211452 A1 | | 7/2015 | Brown |

FOREIGN PATENT DOCUMENTS

| | | | |
|---|---|---|---|
| EP | 2752231 | 7/2014 | |
| JP | 5333550 B2 * | 11/2013 | ............. B01D 39/16 |
| WO | 2004039476 | 5/2004 | |
| WO | 2016077338 | 5/2016 | |

OTHER PUBLICATIONS

"International Search Report and Written Opinion," for PCT Application No. PCT/US2015/059943 dated Jan. 29, 2016 (13 pages).
Extended European Search Report for European Patent Application No. 15859457.2 dated May 22, 2018 (9 pages).
Communication Pursuant to Rules 161(2) and 262 EPC for European Patent Application No. 15859457.2 dated Jun. 22, 2017 (2 pages).
First Office Action for Chinese Patent Application No. 201580058790.1 dated Sep. 17, 2019 (26 pages) with English Translation.
Second Office Action for Chinese Patent Application No. 201580058790.1 dated Mar. 25, 2020 (30 pages) with English Translation.
Communication Pursuant to Article 94(3) EPC for European Patent Application No. 15859457.2 dated Sep. 15, 2020 (5 pages).
Third Office Action for Chinese Patent Application No. 201580058790.1 dated Jul. 20, 2020 (28 pages) with English Translation.

* cited by examiner

FILTRATION MEDIA, FILTER PACKS, AND FILTER ELEMENTS WITH PROTRUSIONS

CLAIM OF PRIORITY

This application is being filed as a PCT International Patent application on Nov. 10, 2015 in the name of Donaldson Company, Inc., a U.S. national corporation, applicant for the designation of all countries and John M. Buettner, III, a U.S. Citizen, Gregg T. Geiger, a U.S. Citizen, Paul A. Way, a U.S. Citizen, inventors for the designation of all countries and claims priority to U.S. Provisional Patent Application No. 62/077,842, filed Nov. 10, 2014, U.S. Provisional Patent Application No. 62/077,848, filed Nov. 10, 2014, and U.S. Provisional Patent Application No. 62/188,003, filed Jul. 2, 2015, the contents of which are herein incorporated by reference in their entirety.

FIELD OF THE INVENTION

The present technology broadly relates to filtration media, filtration media packs, and filter elements. More particularly the present technology relates to filtration media containing projections.

BACKGROUND

Fluid streams, such as gases and liquids, often carry contaminant material therein. In many instances, it is desirable to filter some or all of the contaminant material from the fluid stream. For example, particulate contaminants are often present in air streams to engines for motorized vehicles and for power generation equipment, air and gas streams to gas turbine systems, air and gas streams to various combustion furnaces, and air and gas streams to heat exchangers (e.g., heating and air conditioning). Liquid streams in engine lube systems, hydraulic systems, coolant systems, and fuel systems can also carry contaminants that should be filtered.

It is preferred for such systems that selected contaminant material is removed from the fluid (or has its level reduced in the fluid). A variety of fluid filters (gas or liquid filters) have been developed for contaminant reduction. In general, however, continued improvements are sought.

Pleated filtration media has been in use for many years, and is widely adopted for fluid filtration applications, including gas and liquid filtration. Pleated filtration media provides a relatively large media surface area in a given volume by folding the media back and forth such that a large amount of media can be arranged in a relatively small volume. Pleated media is typically formed from continuous or rolled webs of filtration media, with the pleats formed perpendicular to the machine direction of the media. The machine direction of the media generally refers to the continuous direction of the media as it comes from a source, such as a supply roll. The continuous direction is also sometimes referred to as the machine direction of the media. The pleat folds, therefore, are generally transverse to the continuous direction of the media. In general, a first set of pleat folds forms a first face of the media pack and a second set of pleat folds forms a second face of the media pack, with the first and second pleat folds alternating with one another. It will be understood that in certain embodiments the "face" described herein can be substantially uneven or irregular, and can be planer or non-planer.

One challenge to designing filter elements containing pleated filtration media is that an undesirable level of fluid flow restriction can occur as the number of pleats within a given volume increases. Therefore, a need exists for improved pleated filtration media.

A challenge, specifically for higher viscosity liquid filter elements, is to obtain uniform spacing of pleated filtration media, combined with high enough pleat stiffness. In these cases, it is common to utilize a woven screen to support the downstream side of the filter. This provides both stiffness, but also a flow channel for viscous liquid. In these filters, the problem is where the high forces caused by the viscous liquid causes the upstream pleat surfaces to collapse or bunch with neighboring upstream pleat surfaces. When this occurs, these surfaces are masked and performance is diminished. Therefore, a need exists to provide uniform spacing on the upstream face of the pleat, to create a uniform flow distribution and avoid pleat bunching and masking.

SUMMARY

The present invention involves pleated filtration media and filtration media pleat packs containing the pleated filtration media. The pleated media and media pleat packs contain protrusions on the surface of the media. These protrusions are three dimensional structures that are on the surface of the media. They can be provided in any of a number of ways including forming the protrusion directly in the filtration media or applying structures, such as adhesive beads, onto one or both faces of the media. In some embodiments, the adhesive beads could be secured to one or both adjacent faces of pleated media. Further, the adhesive beads can be elongated in the direction generally perpendicular to the face of the media. Elongation of the adhesive bead can facilitate greater separation of the adjacent faces of pleated media if desired. These protrusions, also referred to herein as projections or dimples, can either contact each other or contact flat media (such as a non-protruded portion of the media) and keep adjacent media faces from becoming in intimate contact with each other. Keeping adjacent faces media from contact each other can be beneficial since where the surfaces come in contact with each other masking can result. Masking is a where media touches each other such that air and its contaminants cannot pass through the media. Corrugations typically have a continuous line of protrusions contrary to the discrete protrusions disclosed herein. It is only where the protrusions touch either themselves or other media that masking will result. Thus a corrugated element can have 20% of the media being masked whereas the media with protrusions can have as little as 1%. Masking reduces the amount of media available for air filtration and increases the pressure drop across the media or element pack reducing its performance.

For liquid filters utilizing woven screen on the downstream face of the filter, it is typically desirable to have projections on the upstream side of the media, but none on the downstream side. Further, projections on filter media in liquid applications can have the benefit of controlling pleat spacing, such as to avoid bunching.

Contaminated or unfiltered air can approach the media on the upstream side and pass through the media to the downstream side. Protrusions or projections can be provided on both the upstream and downstream side of a media. On the upstream side the protrusions can keep the upstream side open so the unfiltered air can have access to all of the upstream volume of the media pleat or pack and to promote uniform spacing. On the downstream side where adjacent media faces are forced together due to the static pressure of the moving air, the protrusions can keep adjacent portions of filter media apart from each other.

The downstream protrusions keep the media apart but owing to the structural properties of the media, deflection of the media can occur between adjacent protrusions. The strength of the media and the distance and height of the protrusions can dictate how much the media deflects. As the media deflects, the downstream gap between adjacent media sheets is reduced resulting in an increased pressure drop. This technology recognizes that for a given protrusion height, as the location of these protrusions are located farther apart, the masking is low due to fewer masking points over a given length, but at the same time the deflection is high due to the large moment of inertia. In a similar manner, as the distance between protrusions is reduced, the masking is increased but the deflection is decreased. Optimum performance occurs at some point where the reduction in deflection is balanced with the increase in masking. This can be dependent on the structural properties of the media as well as the application conditions (i.e. flow rate and pressure drop due to flow rate) where the filter is used.

In some scenarios when corrugated media is pleated, a scoring mechanism compresses the media across its width imparting a weakened score line where the media can be folded. The scoring of corrugated media can create stress along this score line. The media pack can distort due to this stress. By avoiding a continuous corrugation, it is possible to score across a zone in the media that is flat thereby avoiding stress along the score line. This results in a score that is much sharper and straighter and with little stress and distortion resulting in reduced entrance and/or exit pressure loses. Most corrugations are symmetric and have identical upstream and downstream volumes. In some embodiments, the upstream or dirty side of the media is larger than the downstream or clean side of the media thereby providing additional volume for storage of the contaminant. For corrugations, this will require an asymmetric shape to be formed. This asymmetric shape can be difficult to impart and can produce stresses and distortions as previously discussed. Volume asymmetry can be simply achieved by having upstream protrusions different in height from downstream protrusions without imparting an asymmetric shape into the corrugation.

The present invention is also directed to pleated filtration media packs. The phrase "pleated filtration media pack" refers to a media pack constructed or formed by folding, pleating, or otherwise forming filtration media into a three-dimensional network. A pleated filtration media pack can be referred to, more simply, as a media pack.

Pleated filtration media packs can optionally be combined with other features found in filter elements including a seal, a seal support, and pleat pack end encapsulation. In general, a pleated filtration media pack includes filtration media having a first set of pleat folds forming a first face, a second set of pleat folds forming a second face, and the filtration media extending between the first set of pleat folds and the second set of pleat folds in a back and forth arrangement.

The folds are typically formed transverse to the machine direction of the media, but that is not a requirement. The folds can be formed at an angle that is different than an angle transverse to the machine direction. The first face is generally the inlet or outlet of the pleated filtration media, and the second face is the other of the inlet or outlet of the filtration media. For example, unfiltered fluid can enter the pleated filtration media pack via the first face, and filtered fluid can exit the pleated filtration media pack via the second face, or vice versa.

Pleated media made in accordance with the invention can be assembled into numerous shapes and configurations, including panel filters, cylindrical filters, and conical filters. In panel filters, pleated media typically extends in a planar or panel configuration having a first face of the pleated media formed from a first set of pleat folds (also called pleat tips) and a second face of the pleated media formed from a second set of pleat folds (also called pleat tips). The first and second faces formed by the pleat folds are generally parallel. Fluid flows into the panel filter through one face and out of the panel filter through the other face.

In cylindrical or conical filters, pleated media is generally formed into a tube or cone (or a partial section of a tube or cone), with a first face of the pleated media (defined by a first set of pleat tips) creating an interior face, and the second face of the pleated media (defined by a second set of pleat tips) forming an outside face. In the case of cylindrical and conical filters for air filtration, air typically flows into the filter element from the outside face to the interior face (or vice versa in what are sometimes referred to as reverse flow filters).

In an embodiment, a pleated filtration media pack containing a plurality of media pleats, the media pleats comprising: a) filtration media configured for filtration of fluids, the filtration media containing a plurality of pleat folds with media extending between the pleat folds; b) a plurality of projections extending from at least one surface of the filtration media, is provided.

In an embodiment, the projections are spaced from one another between 0.1 inches to 0.25 inches measured from the nearest edge of adjacent projections.

In an embodiment, the projections are spaced less than 0.25 inches measured from the nearest edge of adjacent projections.

In an embodiment, the projections are spaced less than 0.5 inches measured from the nearest edge of adjacent projections.

In an embodiment, the projections are spaced less than 1.0 inch measured from the nearest edge of adjacent projections.

In an embodiment, the projections are arranged in a substantially triangular configuration.

In an embodiment, the projections are arranged in a substantially equilateral triangle configuration.

In an embodiment, the projections are arranged in a substantially rectangular configuration.

In an embodiment, the projections are arranged in a substantially square configuration.

In an embodiment, the height of the projections from the media surface is less than or equal to 0.01 inches.

In an embodiment, the height of the projections from the media surface is less than or equal to 0.05 inches.

In an embodiment, the pleat depth is less than 8 inches.

In an embodiment, the pleat depth is from 8 to 16 inches.

In an embodiment, the filtration media comprises cellulose.

In an embodiment, fibers forming the filtration media comprises at least 25 percent cellulose.

In an embodiment, fibers forming the filtration media comprises at least 50 cellulose.

In an embodiment, fibers forming the filtration media comprises at least 75 percent cellulose.

In an embodiment, the filtration media has a modulus of elasticity of greater than 10,000 pounds per square inch.

In an embodiment, the filtration media has a modulus of elasticity of less than 75,000 pounds per square inch.

In an embodiment, the pleat concentration is at least 3 per inch.

In an embodiment, the average upstream projection height is at least 50 percent greater than the average downstream projection height.

In an embodiment, the projection density is at least 500 projections per square foot.

In an embodiment, the upstream projection density is greater than downstream projection density.

In an embodiment, the upstream projection density is at least twice the downstream projection density In an embodiment, the upstream projection density is at least four times the downstream density.

In an embodiment, upstream projection surface area is equal to downstream projection surface area, but where density is different.

In an embodiment, the projections are spaced in a gradient configuration such that the spacing varies from one face of the media pack to another face of the media pack.

In an embodiment, the projections are spaced in a gradient configuration such that the height varies from one face of the media pack to another face of the media pack.

In an embodiment, the projections are spaced in a gradient configuration such that the height and spacing varies from one face of the media pack to another face of the media pack.

In an embodiment, the projections are formed in a gradient configuration such that the height and/or spacing varies in a direction transverse to the direction extending from one face of the media pack to another face of the media pack (i.e. along the length of the pleat).

In an embodiment, the projections on adjacent surfaces are configured to make contact with one another.

In an embodiment, the media between the projections shows a maximum deformation of 80 percent of the projection height when subject to a pressure of 30 inches $H_2O$.

In an embodiment, the projections are bonded to one another.

In an embodiment, the projections have an oblong shape.

In an embodiment, the projections have a circular shape.

In an embodiment, the projections are substantially ellipsoidal.

In an embodiment, the media pack exhibits volume asymmetry on the upstream volume relative to the downstream volume.

In an embodiment, the projections cover 0.5% to 50% of the filter media area.

In an embodiment, projections are spaced at a distance of 200% to 2000% percent of the average projection height.

The above summary of the present invention is not intended to describe each disclosed embodiment of the present invention. This is the purpose of the detailed description and claims that follows.

BRIEF DESCRIPTION OF THE DRAWINGS

The invention may be more completely understood in consideration of the following detailed description of various embodiments of the invention in connection with the accompanying drawings, in which.

Figure 1:
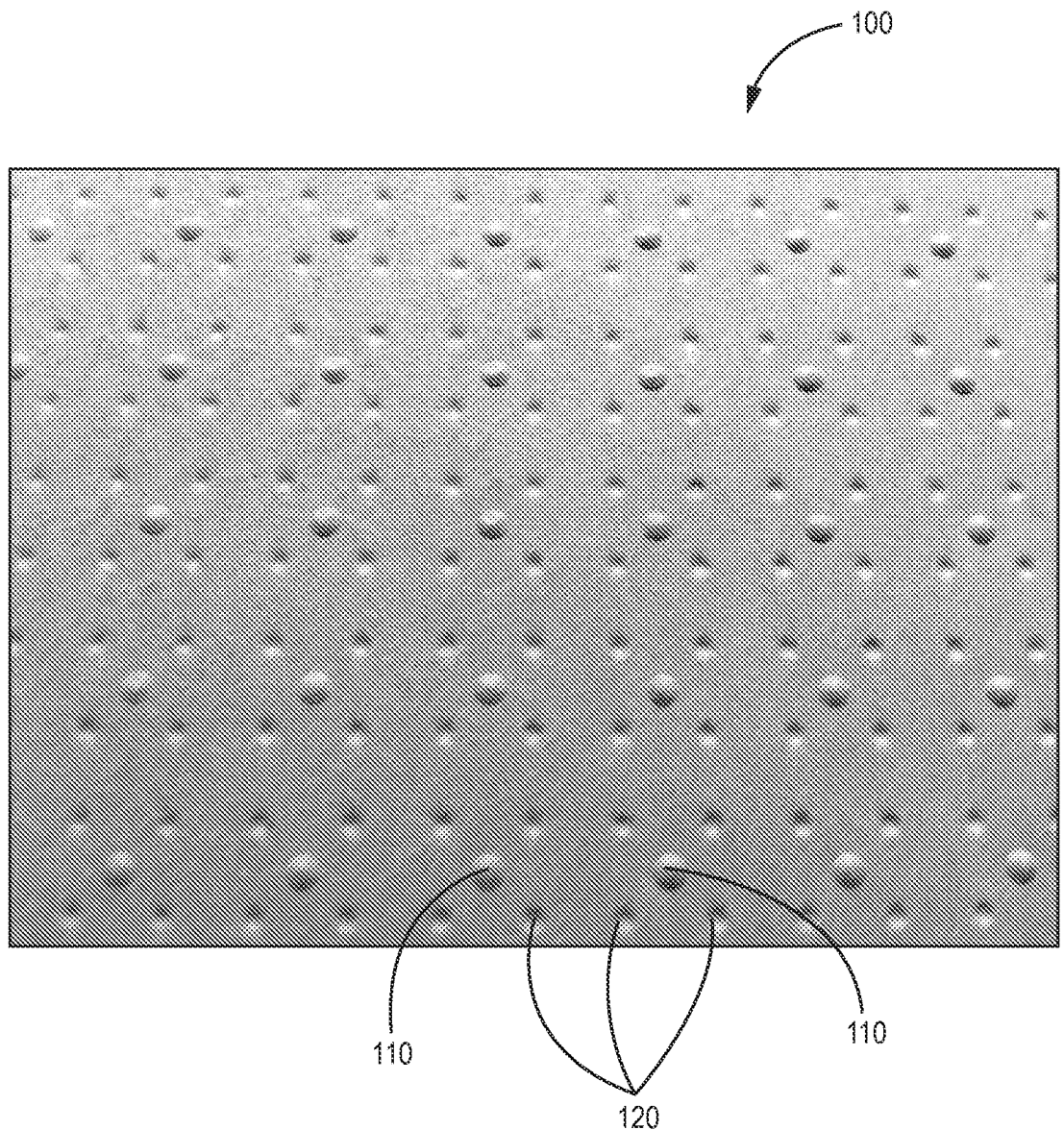
FIG. 1 is a top photographic view of a first surface of filtration media constructed and arranged in accordance with an implementation of the invention.

These figures are to be considered general representations of the invention, and it will be appreciated that they are not drawn to encompass all embodiments of the invention, nor are they always drawn to scale. It will also be understood that media made in accordance with the invention will generally exhibit variation. While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION

The present invention is directed to filtration media, filtration media pleat packs, and filter elements with projections. Various embodiments are described herein. It should be understood that all of the aspects of different embodiments described can be combined with aspects of other embodiments described in any combination.

The filtration media contains a plurality of projections. The projections are three dimensional structures formed in the filtration media that can provide flow paths along the pleat surfaces, can allow for flow of fluids through the media, can allow adjacent media faces to be maintained at desired spacing to one another, and can provide for improved contaminant removal. A projection or protrusion can include a formed projection, such as an embossment. Alternatively, a projection can include an applied projection, such as a glue bead or other material that is applied to the filter material. In various embodiments, an applied projection can be applied to a filter material that is brittle, such as if the filter material is too brittle such that the filter material would tear, break, or otherwise fail when forming an embossment. An applied projection can minimize the strain on the media.

The projections can also aid in decreasing the amount of masking, which is areas where adjacent pleats contact one another or approach closely to one another such as to reduced fluid flow at that point of contact or near-contact. Masking can refer to areas of filter material that have restricted or reduced fluid flow, such as due to a blockage or contact. Masking refers to areas where two sheets of filter material can contact each other and prevent fluid flow through the sheets of filtration media thereby decreasing the amount of usable filter material.

The projections are generally small protrusions or other extensions extending upward from the surface of the media. In typical embodiments large numbers of projections will be present on the pleated media. The projections, when viewed from above the media surface can be, for example, round, oval, elliptical, or polygonal. Typically the projections will have curved edges so as to minimize media strain. The projections can vary in size and shape, and upstream surfaces of the media will often have different shapes, sizes, and/or numbers of projections than the downstream surfaces. Indeed, it is possible to have projections on just one side of the media, either on the upstream side or the downstream side. However, it is typically desirable to have at least some projections on the downstream side of the media so as to avoid the media sheets from pushing against one another under pressure from the upstream side of the filter pack. Further the shape and/or size of the projection can be enlarged or optimized to add stiffness to the media.

In at least one embodiment of the invention the projections on an upstream side of the filtration media are a different size than the projections on the downstream side of the filtration media. In an alternative embodiment, the sizes of the projections adjacent to pleat folds differ relative to those projections that are not adjacent to pleat folds.

The pleated filtration media pack can be used to filter a fluid that is a gaseous or liquid substance. An exemplary gaseous substance that can be filtered using the filtration media is air, and exemplary liquid substances that can be filtered using the filtration media include water, oil, fuel, and hydraulic fluid. The filtration media pack can be used to separate or remove at least a portion of a component from a fluid to be filtered. The component can be a contaminant or another material targeted for removal or separation. Exemplary contaminants and materials targeted for removal include those characterized as solids, liquids, gases, or combinations thereof. The contaminants or materials targeted for removal can include particulates, non-particulates, or a mixture thereof. Materials targeted for removal can include chemical species that can be captured by the media. The reference to removal of components and contaminants should be understood to refer to the complete removal or separation or a partial removal or separation.

Now referring to the drawings, FIG. 1 shows a photograph of a sheet of embossed media 100. The embossed media 100 includes a plurality of a first type of projection 110 and a second type of projection 120, which, for clarity, will be referenced by their relative sizes, such that the first type of projection 110 will be referred to as the "large projections 110" and the second type of projection 120 will be referred to as the "small projections 120." In the depicted view, the large projections 110 project upward, and the small projections 120 project downward. Although not visible from FIG. 1, the media 100 photographed in FIG. 1 is constructed such that large projections 110 are meaningfully taller than small projections 120. Also, in the embodiment depicted in FIG. 1, there are four small projections 120 for every large projection 110. In an embodiment, the projections can be different sizes on the same surface, such as projections closer to a first end are smaller or larger than projections closer to the second end. It should be understood that a media with an applied projection could have a similar projection pattern as shown in the embossed media 100 in FIGS. 1 and 2.

Figure 2:
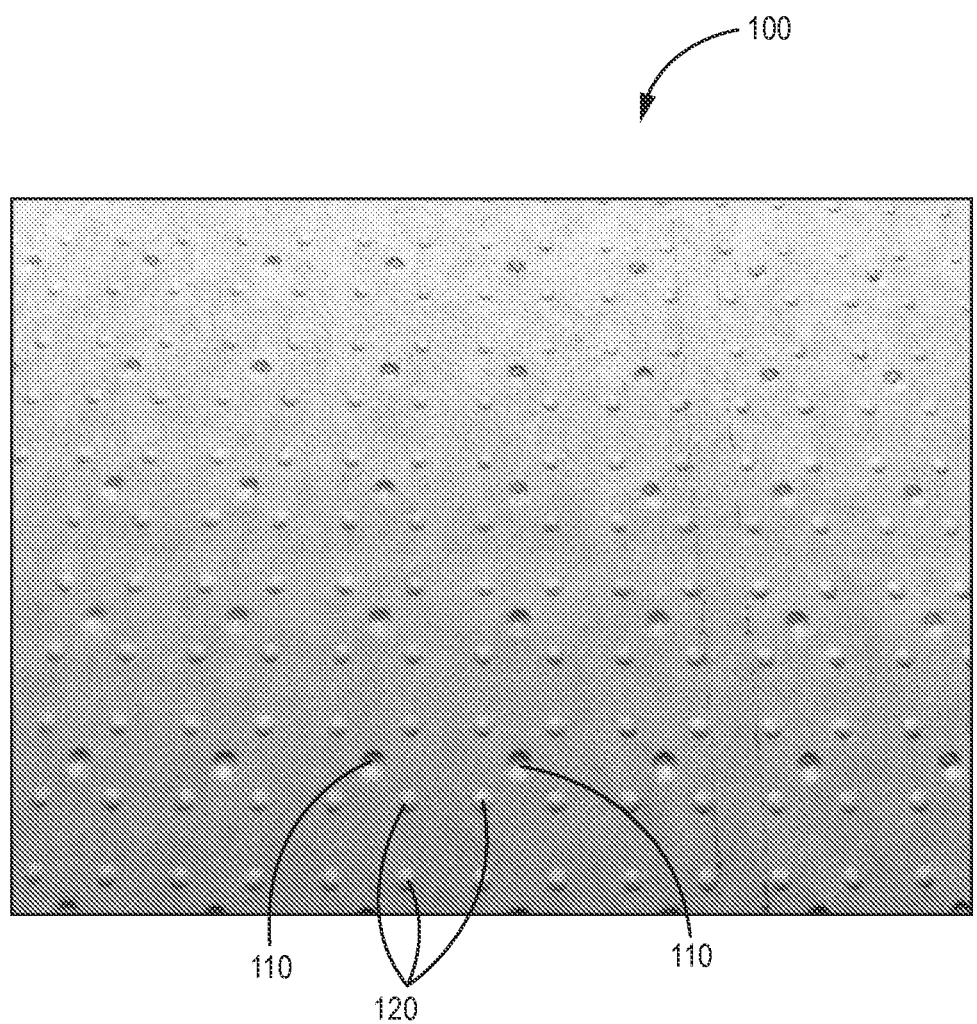
FIG. 2 is a top photographic view of a second surface of filtration media constructed and arranged in accordance with an implementation of the invention, showing the opposite side of the first surface shown in FIG. 1.

FIG. 2 shows the opposite surface of the filtration media 100 of FIG. 1, with large projections 110 projecting downward, and small projections 120 projecting upward.

Figure 3:
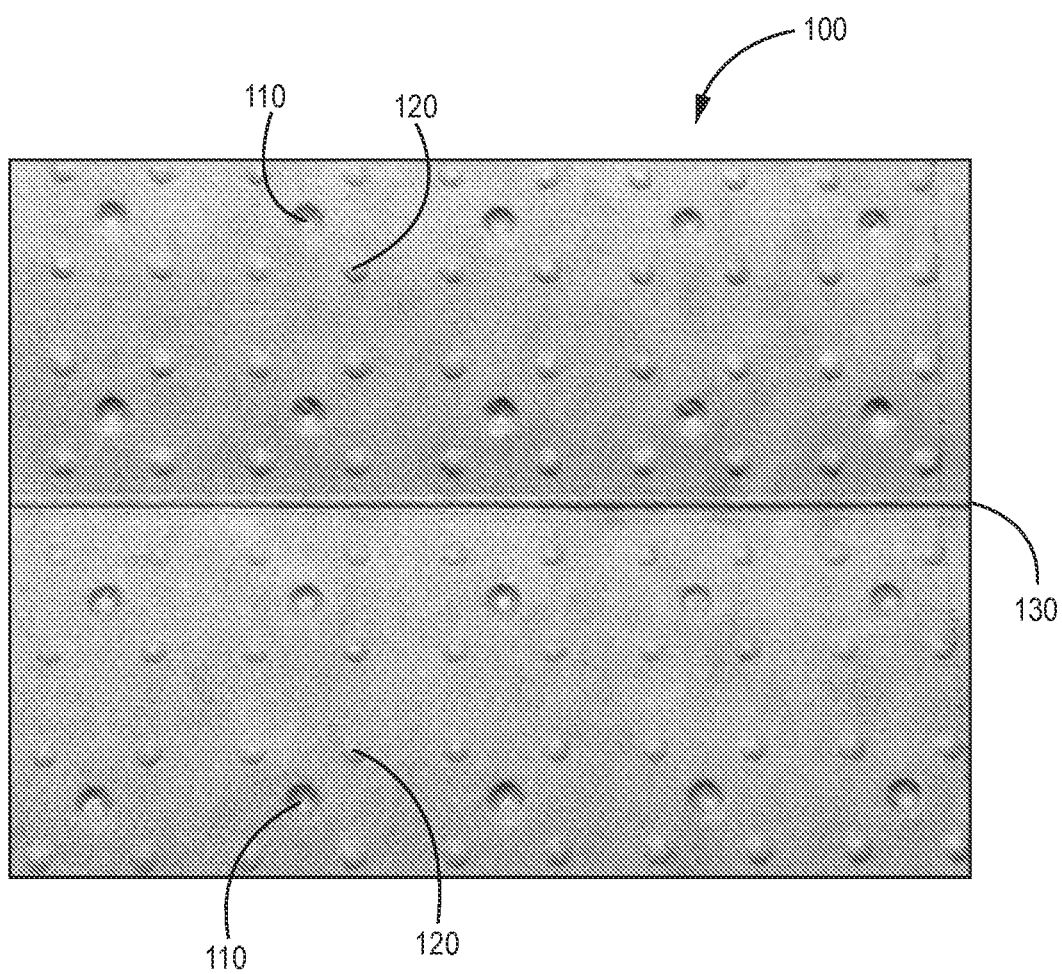
FIG. 3 is a top photographic view of filtration media constructed and arranged in accordance with an implementation of the invention, showing projections in the filtration media as well as a pleat fold line.

FIG. 3 shows a close up of filtration media 100, with large projections 110, small projections 120, and a pleat fold line 130. It will be observed that each of the large projections 110 on one side of the pleat fold 130 aligns with a second corresponding large projection 110 on the other side of the pleat fold 130. Similarly, each small projection 120 has a corresponding small projection 120 on the other side of the pleat fold 130. The media 100 of FIG. 3 can be folded either "upward" or "downward" along pleat fold 130. In one instance the result is that the large projections 110 come in contact with one another, while in the other instance the result is that the small projections 120 come in contact with one another.

Generally it will be desired that the upstream side of a pleat pack has larger pleat spacing than the downstream side (since the upstream side will undergo loading of contaminants). Therefore, typically the upstream side of the pleat pack will have larger projections contacting one another than the downstream side of the pleat pack. It will be understood, however, that alternative configurations are possible. Therefore, for example, opposite configurations are possible wherein the upstream side of a pleat pack has smaller projections than the downstream side.

Although FIGS. 1 to 3 show large projections on one side of the media 100, and small projections on the opposite side of the media 100, in alternative embodiments large and small projections are present on both sides of the media 100. In yet another implementation the projections are all the same size. In yet other implementations projections are formed on only one surface of the media (although depressions are then formed on the opposite face).

The projections shown in FIGS. 1 to 3 are all generally circular in shape (when viewed in outline from above). In other implementations the projections have other shapes, such as ovals, elipses, polygons, or other shapes.

Figure 4:
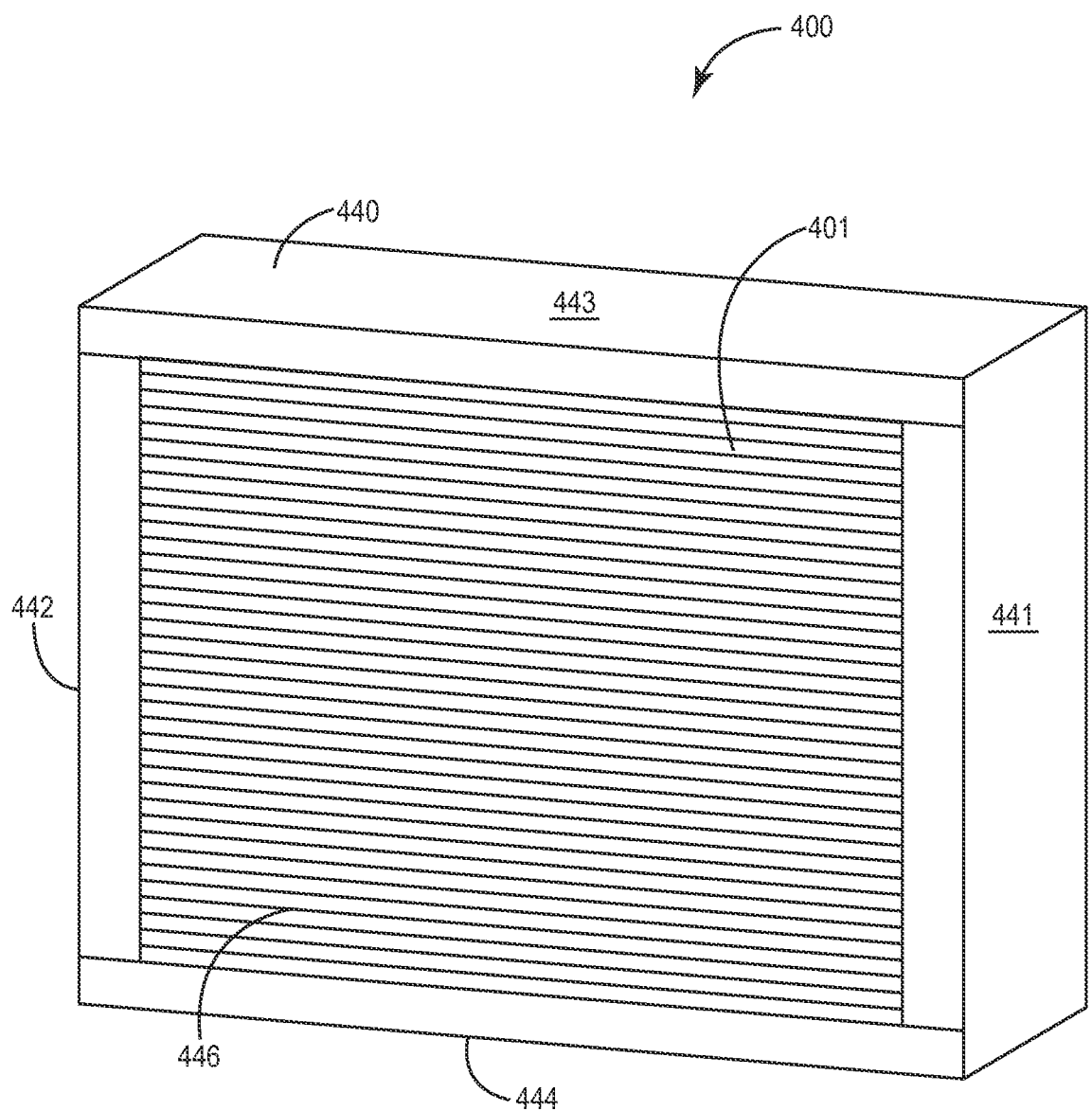
FIG. 4 is a perspective view of an example filter element consistent with an implementation of the invention.

FIG. 4 shows a filter element 400 from a front perspective view, the filter element made utilizing media with protrusions in accordance with the present invention. The filter element 400 has pleated filtration media 401 with a front face 446 and has a frame 440 surrounding pleated filtration media 401. Although not depicted in this figure, the pleated filtration media 401 has a corresponding back face. In addition, the frame has a right side 441, a left side 442, a top 443, and a bottom 444.

The front face 446 of the filtration media 401 is typically the "upstream" side of filter element 400, and the back face is the "downstream" side of the filter element 400. Thus, in a typical embodiment, the flow of fluids through the filter element 400 is from the front face 446, into the interior of filter element 400, and then out through the back face. Passing through the filter element 400 necessitates traveling through the filtration media 401.

Figure 5:
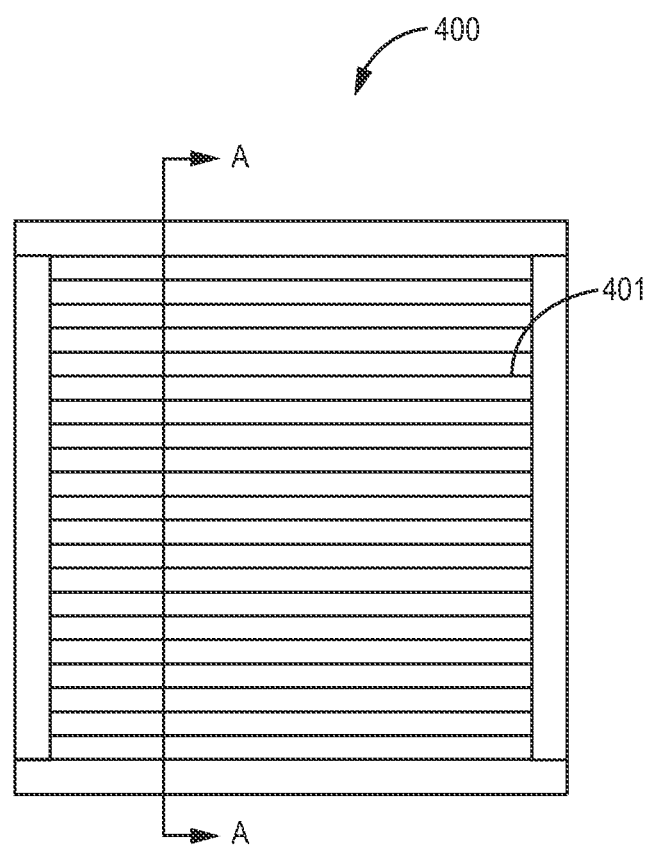
FIG. 5 is a front view of a filter element consistent with an implementation of the invention.

FIG. 5 shows a front view of the filter element 400. FIGS. 6 through 13 show different cross-sections of a portion of the filter element 400 along line A-A according to different embodiments.

FIGS. 6 through 9 depict schematic cross-sectional views of example pleated filtration media in accordance with the technology disclosed herein. It will be understood that these figures are representational only, and are not drawn to scale. Actual filtration media would also show irregularities not depicted in the figures.

FIGS. 6 through 9 further depict projections contacting projections. In alternative embodiments, a projection can contact a flat portion or non-projected portion of the filter media. In various embodiments projections that contact each other can be bonded together, such as to substantially maintain the pleat spacing or to avoid projections nesting during operation or assembly. In some embodiments, an adhesive can be disposed between two contacting projections, such as to bond them together. In some embodiments, all of the projection to projection contacts are bonded. In some embodiments, a portion of the projection to projection contacts are bonded. Similarly, the contact between a projection and a non-projection portion of an adjacent pleat can be bonded on non-bonded. In some embodiments, bonding material itself can be used to both provide physical separation in adjacent media faces and also to provide adhesion.

Figure 6:
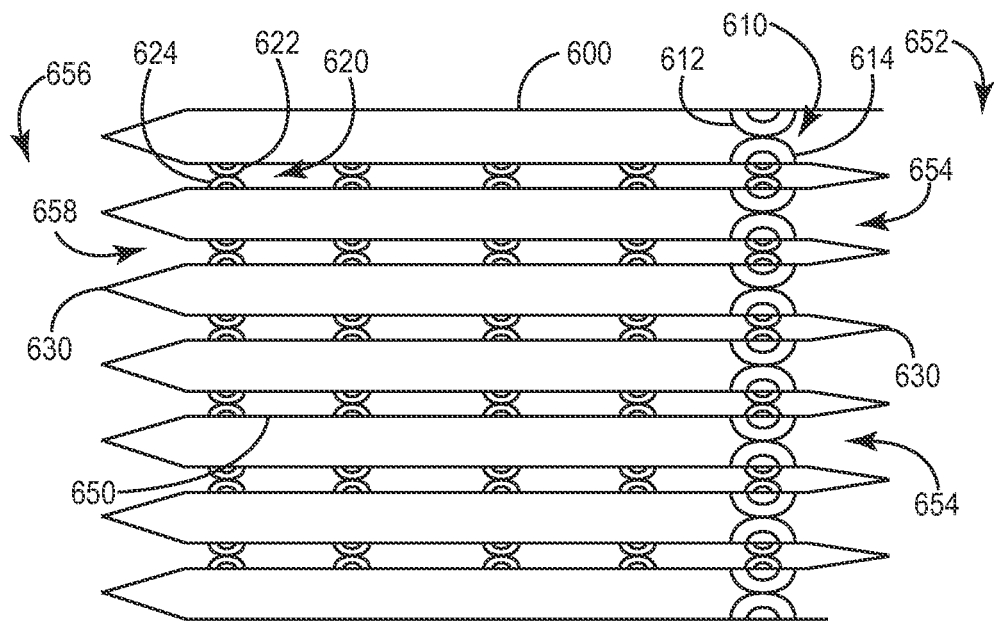
FIG. 6 is a schematic cross-sectional view of filtration media consistent with an implementation of the invention.

Referring first to FIG. 6, the media 600 has a plurality of media segments 650 extending between a downstream side 656 of the filtration media 600 and an upstream side 652 of the filtration media 600, where each media segment 650 is defined by a pleat fold 630 on the downstream side 656 and a pleat fold 630 on the upstream side 652. The adjacent pairs of pleat folds 630 on the upstream side 652 of the filtration media 600 define upstream pathways 654 through which a filterable fluid is introduced into the filtration media 600. In other words, the upstream side 652 of the filtration media 600 defines the filter inlet 654. Likewise, the adjacent pairs of pleat folds 630 on the downstream side 656 of the filtration media 600 define a filter outlet 658. A fluid entering a pleat pack flows along the inlet 654 and eventually passes through filtration media 600 and then flows out of the pleat by way of the outlet 658 (with the exception of small amounts of fluid that will pass through the actual pleat fold 630). Fluid flow through the media 600 can cause various pressure differentials across the filtration media 600 resulting in collapsing of the space between some pleats, and expanding of the space between others.

Projections 610, 620 can be defined by the media to prevent the media from changing shape in response to pressure changes on the system. Generally projections 610, 620 are used to retain space between adjacent media segments 650. In FIG. 6, for example, a plurality of a first pair of projections 610 is defined by the filtration media 600 within each upstream pathway 654 that are configured to retain space between each media segment 650 in the upstream pathway 654. As such, a first projection 612 defined by the filtration media has a peak area that is configured to rest against the peak area of a second projection 614 when the media is folded about the pleat fold 630 on the downstream side 656 of the filtration media 600.

A plurality of second pairs of projections 620 are defined by the filtration media 600 to retain space between the media segments 650 through downstream pathways 658 defined by the adjacent downstream pleat folds 630. As such, the peak area of one projection 622 defined by the filtration media 600 is configured to rest against the peak area of an adjacent projection 624 when the filtration media 600 is folded about the pleat fold 630 on the upstream side 652 of the filtration media 600.

Figure 7:
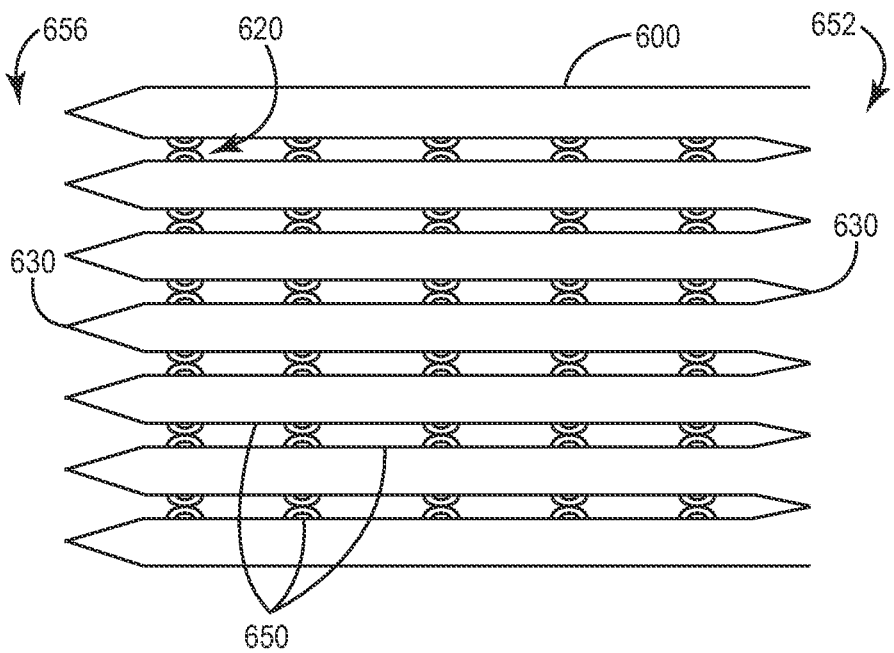
FIG. 7 is a schematic cross-sectional view of filtration media consistent with an implementation of the invention.

FIG. 7 depicts an alternative schematic of filtration media consistent with the technology disclosed herein. The embodiment depicted in FIG. 7 is similar to the embodiment depicted in FIG. 6, except that the pleat tips 630 on the upstream side 652 of the filtration media 600 are fixed, instead of incorporating a pair of projections, to retain spacing between the media segments 650. The pleat tips 630 can be fixed to string, tape, a portion of filtration media, a frame, and/or the like, at discrete points along various lengths of the media 600. The pairs of projections 620 on the downstream side 656, however, are very similar to those described in the discussion of FIG. 6, above.

Figure 8:
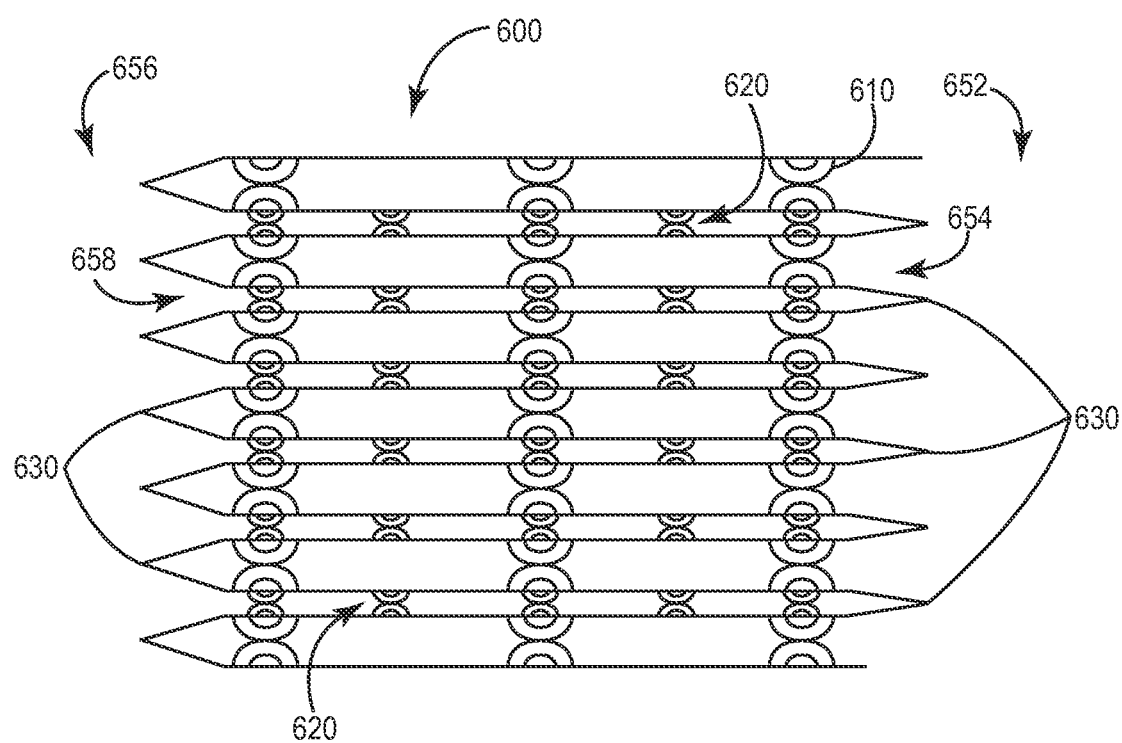
FIG. 8 is a schematic cross-sectional view of filtration media consistent with an implementation of the invention.

FIG. 8 depicts yet another alternative schematic of filtration media consistent with the technology disclosed herein. This embodiment exhibits a plurality of pairs of downstream projections 620 along the entire length of each downstream space 658 and a plurality of pairs of upstream projections 610 along the entire length of the upstream space 654. In addition, the pleat tips 630 on the upstream 652 side are narrower than the pleat tips 630 on the downstream side 656, creating an inlet 654 with a greater volume than the outlet 658.

Although the depicted embodiments in FIGS. 6 to 8 primarily show configurations wherein the projections make contact with opposing projections on adjacent pleats, it will be understood that in some implementations some or all of the projections will not make contact with opposing projections. Indeed, in certain embodiments the adjacent pleats might be flat or substantially flat, and free or substantially free of projections.

Figure 9:
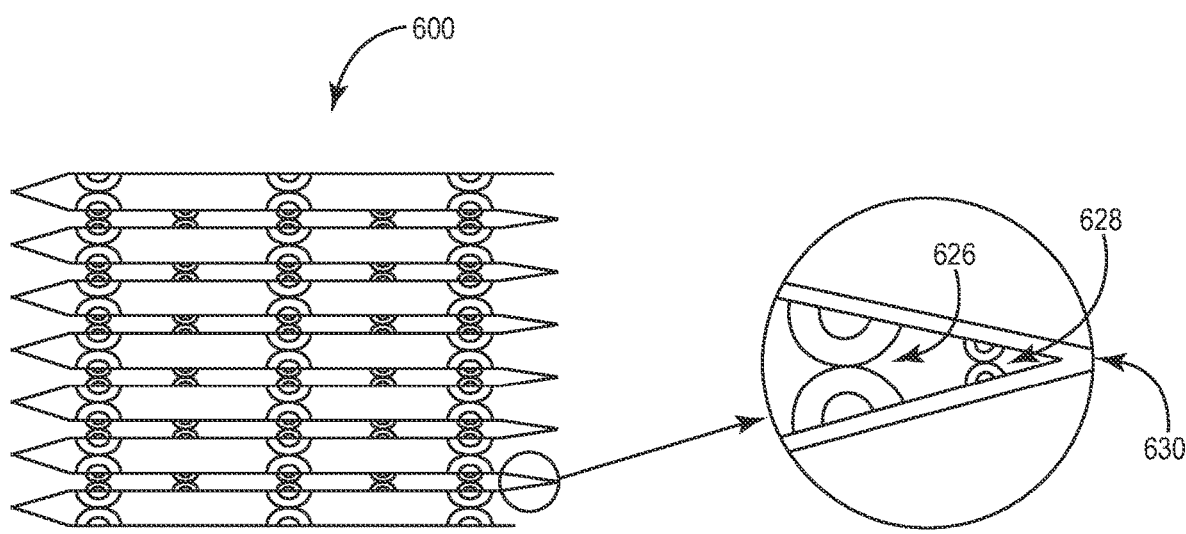
FIG. 9 is a detailed view of the filtration media depicted in FIG. 8.

FIG. 9 depicts a schematic of an embodiment with modifications to the embodiment depicted in FIG. 8. In this embodiment a third and fourth pair of projections 626, 628 are defined by the filtration media 600 approaching the pleat tip 630 such that the taper of the pleat tip 630 is retained.

Figure 10:
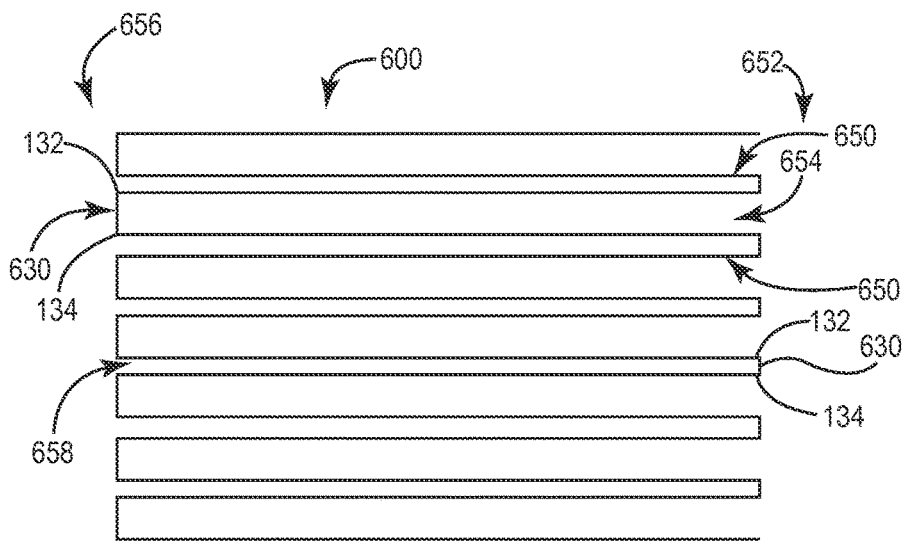
FIG. 10 is a schematic cross-sectional view of a filtration media having no taper, consistent with an implementation of the invention.
Figure 11:
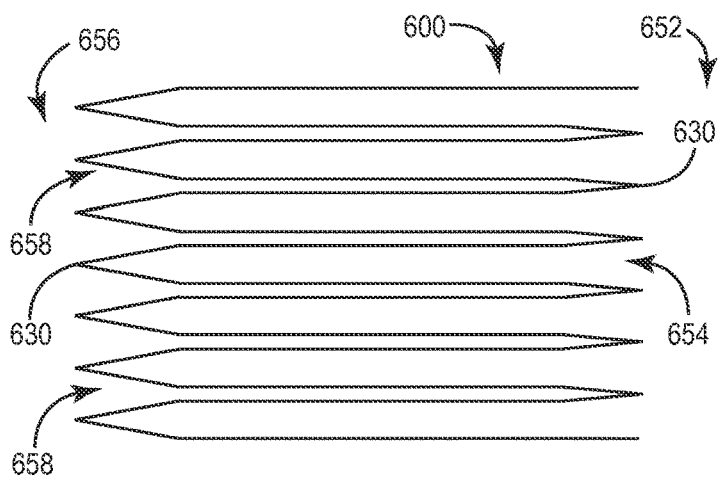
FIG. 11 is a schematic cross-sectional view of a filtration media having a partial taper, consistent with an implementation of the invention.
Figure 12:
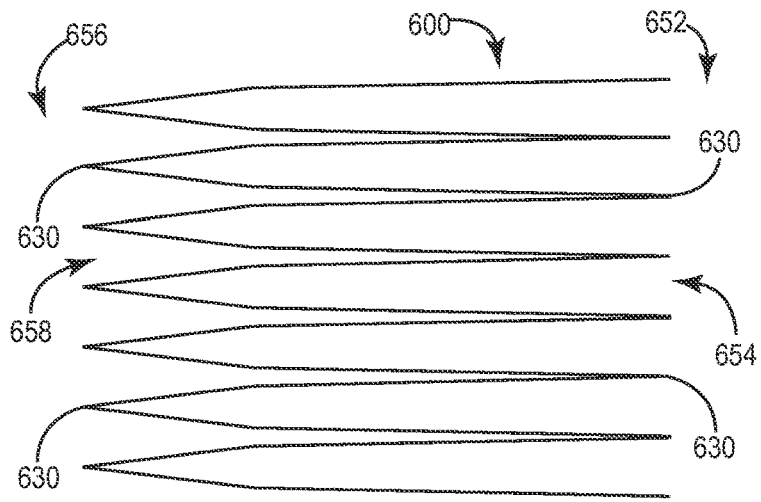
FIG. 12 is a schematic cross-sectional view of a filtration media having a full or substantially full taper, consistent with an implementation of the invention.
Figure 18:
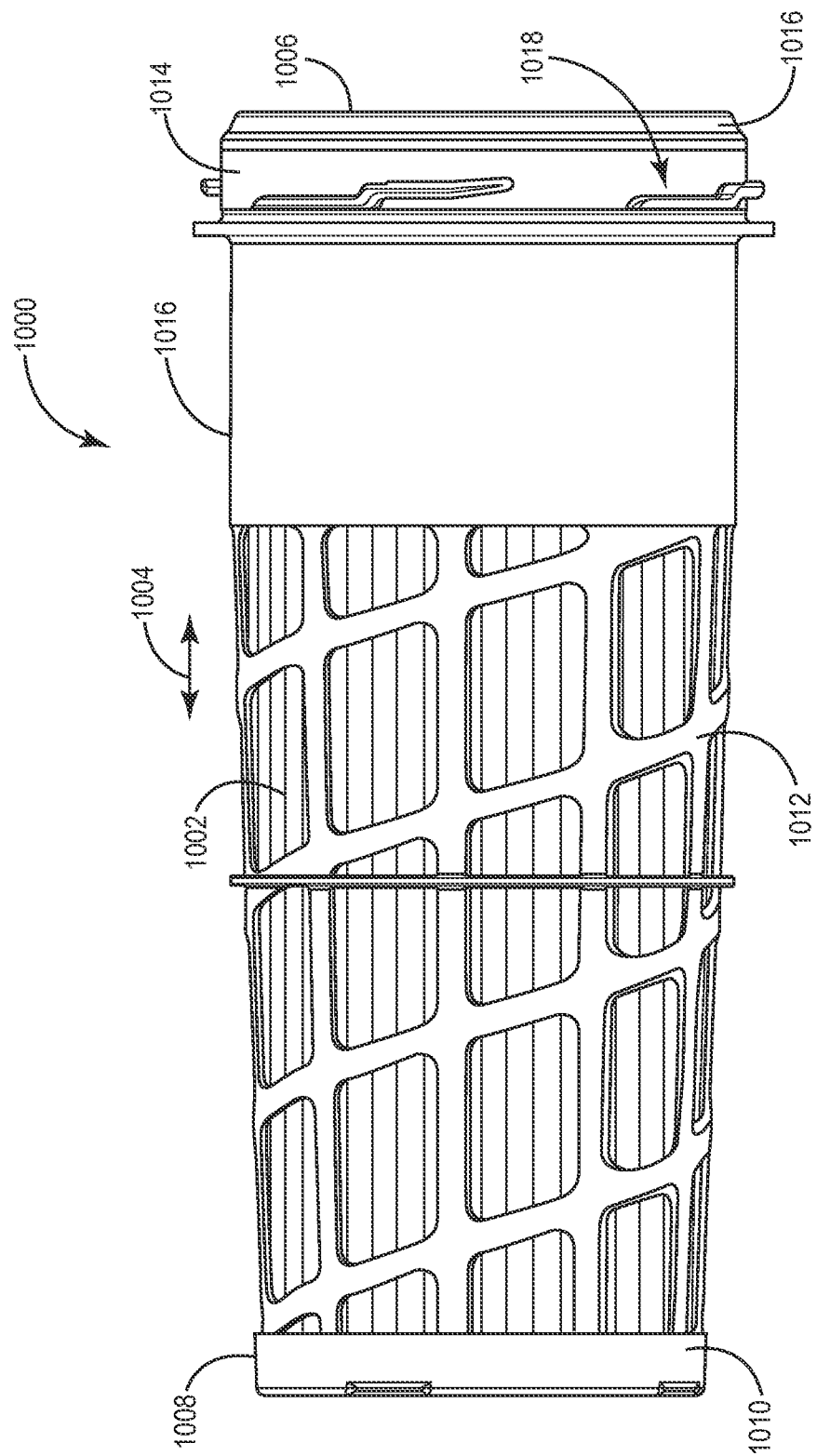
FIG. 18 is a side view of an example filter element consistent with an implementation of the invention.
Figure 19:
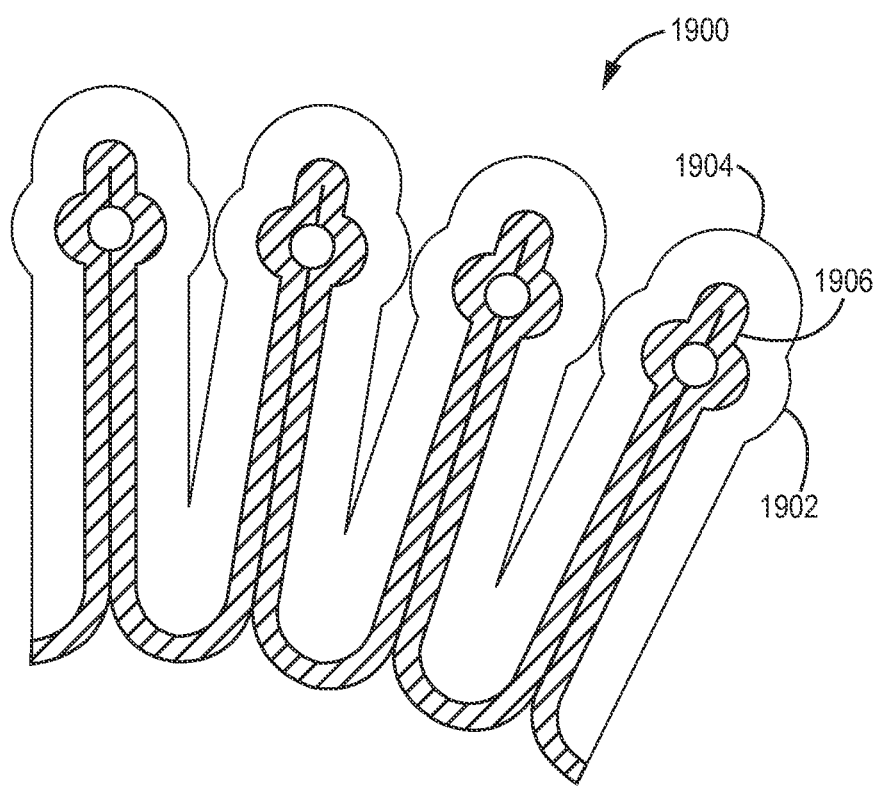
FIG. 19 is a schematic of a filter used for high viscosity liquids utilizing screen on the downstream face of the pleats and protrusions on the upstream face of the pleat to create uniform pleat spacing for uniform flow.

FIGS. 10-12 are schematics of filtration media constructions with various pleat tips having varying tapers. For example, FIG. 10 depicts filtration media 600 having no taper, where each pleat tip 630 has a particular width and is defined by an upper fold line 132 and a lower fold line 134. The pleat tips 630 on the inlet side 652 of the filtration media 600 can have a first width and the pleat tips 630 on the outlet side 654 can have a second width. FIGS. 18 and 19 each depict tapered media, where a pleat tip 630 is a single fold line and the volume of the inlet 654 increases towards the upstream 652 pleat tips 630, and the volume of the outlet 658 increases towards the downstream 656 pleat tips 630. Although not depicted in FIGS. 17 to 19, it will be understood that any of the filtration media schematics shown in FIGS. 17 to 19 can included projections so as to preserve the geometry of the media constructions.

Figure 13:
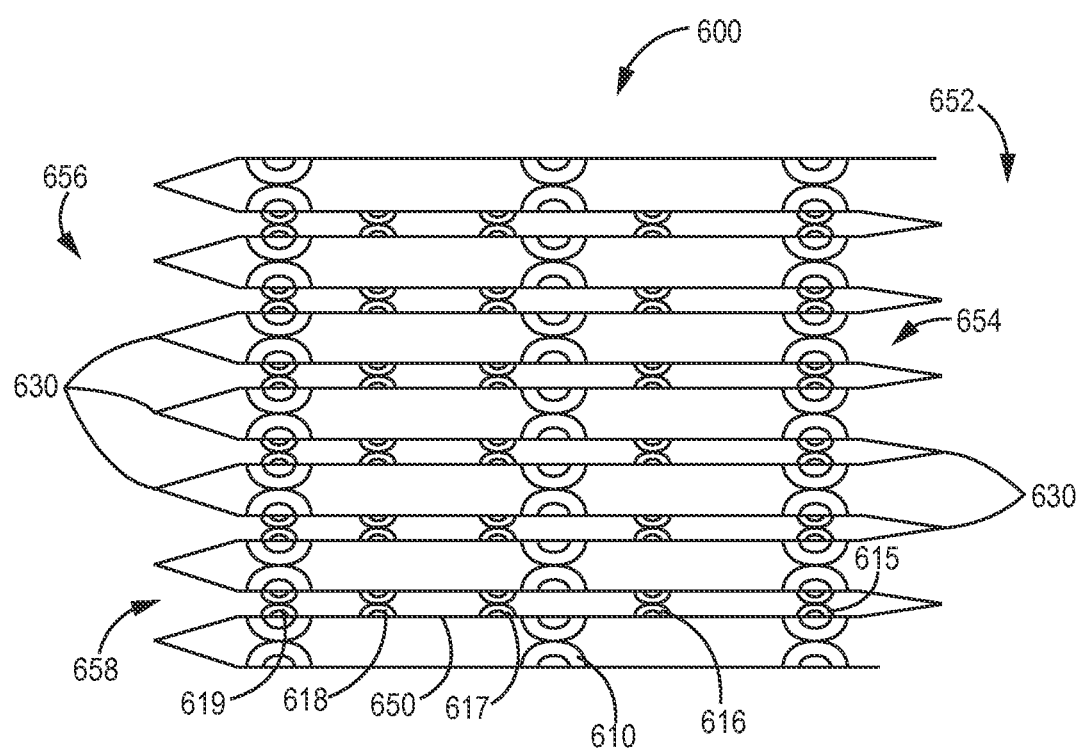
FIG. 13 is a schematic cross-sectional view of a filtration media having projections irregularly spaced, consistent with an implementation of the invention.

FIG. 13 shows a cross-sectional view of a filtration media 600 having projections irregularly spaced. In an embodiment, the spacing from between the projections can be irregular, such that some of the projections are closer to their adjacent projections compared to other projections. In an embodiment, the projections can be closer together on one end compared to the opposite end.

FIG. 13 shows projections 615, 616, 617, 618, 619 on the downstream side 656. The distance between the first projection 615 and the second projection 616 is larger than the distance between any other two adjacent projections on the downstream side 656. The distance between the second projection 616 and the third projection 617 is larger than the distance between any other two adjacent projections on the downstream side 656, except for the first projection 615 and the second projection 616. The closer to the outlet 656 the projections are, the closer the projections are to the next adjacent projection. The distance between the fifth projection 619 is smaller than the distance between any other two adjacent projections on the downstream side 656. The distance between the fourth projection 618 and the third projection 617 is smaller than the distance between any other two adjacent projections on the downstream side 656, except for the distance between the fifth projection 619 and the fourth projection 618.

Figure 14A:
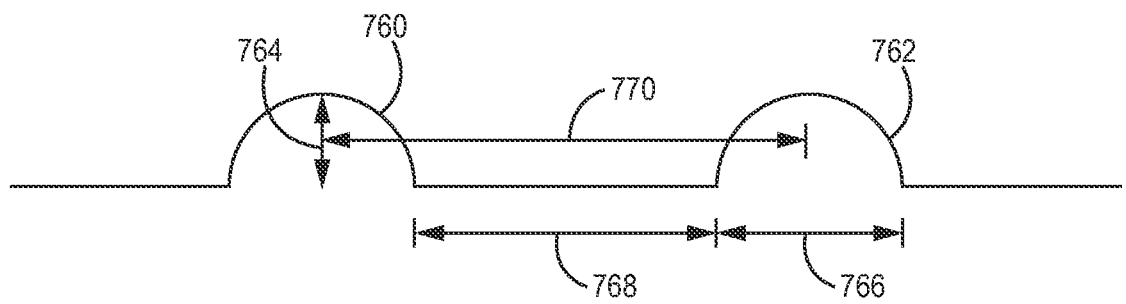
FIG. 14A is a schematic side view of two projections, consistent with an implementation of the invention.

FIG. 14A is a schematic side view of two projections 760, 762, consistent with the technology disclosed herein. The projections can be of a wide variety of shapes and sizes. The specific projection size can be selected based on the application of the filtration media. The width and height of the projection can be varied.

The height of the projection can refer to the distance between the top of the projection and the flat portion of filtration media, represented by line 764. In an embodiment, the average height of projections can range from 0.005 inches to 0.05 inches. In an embodiment, the average height of the projections on a first surface can be less than or equal to 0.01 inches. In an embodiment, the average height of the projections on a first surface can be less than or equal to 0.05 inches. In an embodiment, the average height of the projections on a second surface can be 0.0275 inches. In an embodiment, the average upstream projection height can be at least 50% greater than the average downstream projection height. In an embodiment, the downstream projections can have an average height of 0.015 inches. In an embodiment, the upstream projections can have an average height of 0.030 inches.

The projections size or projection width can vary, depending on the application. The projection width can be represented by line 766 shown in FIG. 14A. The projections can vary in width from 0.03 inches to 0.375 inches. In an embodiment, the projections can cover from 0.25% to 38.35% of the surface area of the filtration media.

The distance between projections can also vary, depending on the application or within a single filter element as discussed in regards to FIG. 13. Generally, the distance between two projections is from the edge of a projection to the edge of an adjacent projection, such as represented by line 768. The distance between two projections can be the distance from the edge of one projection to the edge of the other projection. In an alternative embodiment, the distance from one projection to another projection can be represented by line 770. Line 770 references the center to center distance, such as the distance from the center of one projection to the center of a second projection.

The maximum distance between two adjacent downstream projections along a pleat can be 0.8 inches or less. The maximum distance between two adjacent projections can be 0.5 inches or less. In an embodiment, the maximum distance between two adjacent projections can be 0.2 inches or less, such as to limit the amount of deformation of the media (between the projections). In an embodiment, the projections can be spaced from one another between 0.1 inches to 0.25 inches measured from the nearest edge of adjacent projections. In an embodiment, the projections can be spaced less than 0.25 inches from the nearest edge of an adjacent projection. In an embodiment, the projections can be spaced less than 0.5 inches from the nearest edge of an adjacent projection.

In an embodiment, the maximum distance between two adjacent projections can be dependent on the location of the two projections along the pleat, such as the maximum distance between two projections closer to an inlet end can be greater than the maximum distance between two projections closer to the outlet end (distance decreases as depth/ away from inlet increases).

In an embodiment, the amount of deformation for media between projections is limited to the height of the projections, such as to prevent adjacent sheets of filtration media contacting each other between projections. In an embodiment, the amount of deformation of the media between projections is limited to a percentage of the height of a projection, such as 95%, 90%, 85%, 80%, 75%, 70%, or 50%. In an embodiment, the amount of deformation of the media between the projections is a maximum deformation of 80% percent of the projection height, when subject to an elemental pressure differential of 30 inches $H_2O$ (pressure differential at upstream and downstream faces of element). In an embodiment, the projection spacing can be relative to the projection height, such that the projections can be spaced at a distance of 267% to 667% percent of the average projection height.

In an embodiment, the filtration media can include a projection density, such as a certain number of projections per unit of area. In an embodiment, the projection density can be from 500 projections/$ft^2$ to 5000 projections/$ft^2$. In an embodiment, the projection density of the upstream projections is less than the projection density of the downstream projections. In an embodiment, the downstream projection density is at least twice the upstream projection density. In an embodiment, the downstream projection density is at least four times the upstream projection density. In an embodiment, the upstream projection surface area is substantially equal to the downstream projection surface area, and the upstream projection density differs from the downstream projection density.

The spacing between projections can be dependent on the type of media, and the airflow through the media. The strain limit can reference the point at which the media begins to fail, such as to rupture or tear. In an embodiment, the yield strain limit of the media in the weakest direction can be 8% of the yield strain limit of the media in the weakest direction.

Figure 14B:
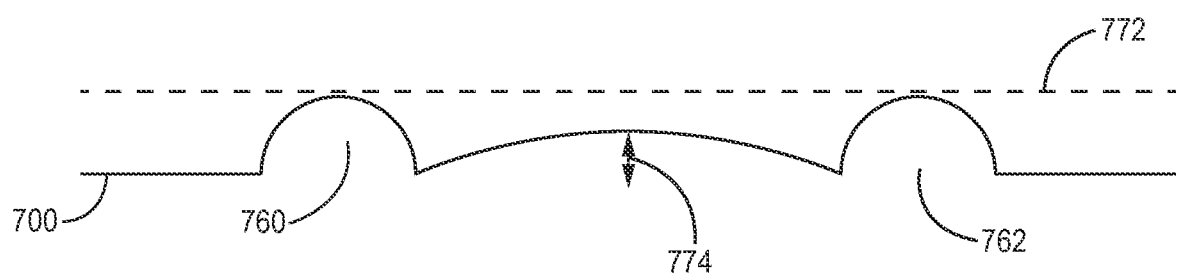
FIG. 14B is a schematic side view of two projections, consistent with an implementation of the invention.

FIG. 14B is a schematic side view of a filter media 700 with two projections 760, 762 that is consistent with deflection between two projections 760, 762 under a load, such as flow through the filter. The filter media 700 can flex or deform, such as when filtering a fluid stream. In an embodiment, the amount of deformation of the filter media 700, represented by arrow 774, can be limited to the height of projections, represented by line 772 or limited to less than the height of the projections. The amount of deformation can be limited, such as to prevent two adjacent sheets of filter media touching at a position other than at a projection.

Figure 15A:
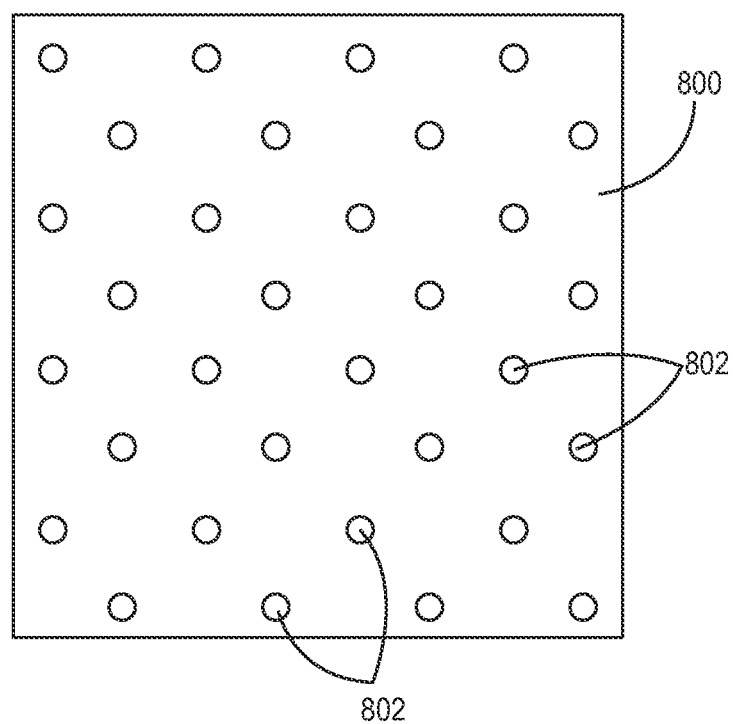
FIG. 15A is a schematic top view of a first surface of filtration media consistent with an implementation of the invention.

FIG. 15A is a schematic top view of a first surface 800 of filtration media constructed and arranged in accordance with an implementation of the invention. FIG. 15A shows a plurality of projections 802 in a diamond shaped pattern. The projections can be in a substantially rectangular orientation to one another, as shown in FIGS. 1 and 2.

Figure 15B:
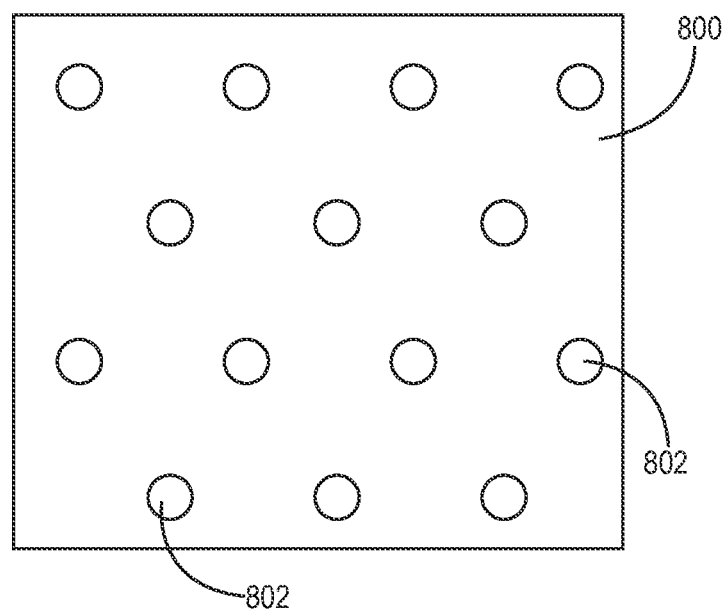
FIG. 15B is a schematic top view of a first surface of filtration media consistent with an implementation of the invention.

The projections 802 can be positioned in a substantially equilateral triangle orientation to one another, such as shown in FIG. 15B. In an embodiment, the projections can be arranged in a substantially triangular configuration. In an embodiment, the projections are arranged in a substantially equilateral triangle configuration.

In an embodiment, the projections can be positioned in a repeating pattern, such as a square, a rectangle or a diamond. In an embodiment, the projections can be arranged in a substantially rectangular configuration. In an embodiment, the projections can be arranged in a substantially square configuration, such as shown in FIG. 1. In an embodiment, the projections can be positioned gradient manner, such as shown in FIG. 13. In an alternative embodiment, the projections can be positioned in an irregular or non-repeating pattern.

Figure 16:
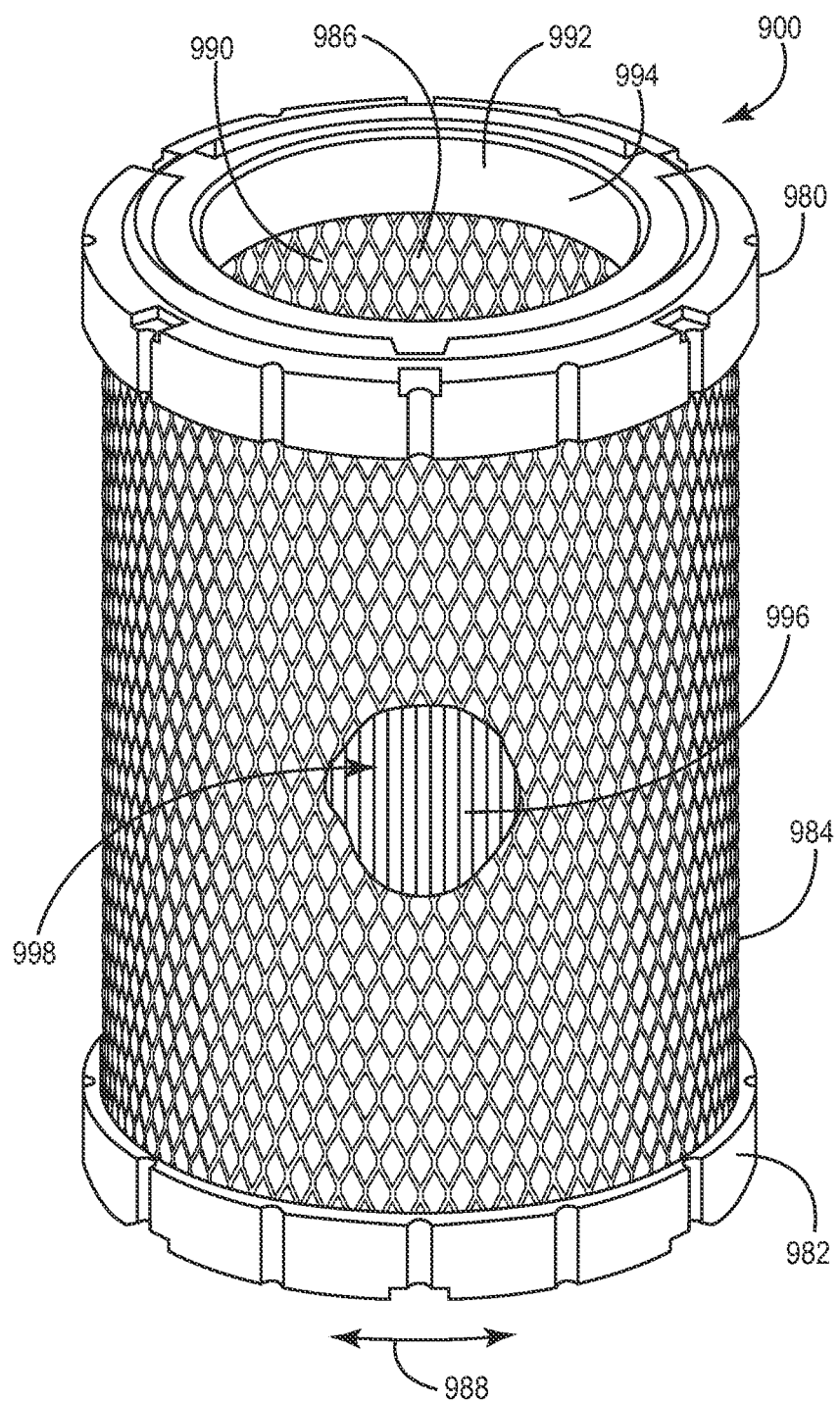
FIG. 16 is a perspective view of an example filter element consistent with an implementation of the invention.

The filtration media depicted in FIGS. 1 through 3 and FIGS. 6 through 13 can be formed into a variety of filter elements. FIG. 16 depicts an example cylindrical filter arrangement that can be produced using filtration media with projections. The filter arrangement 900 comprises first and second end caps 980 and 982 having pleated media 996 extending there between. Pleat folds 998 of the pleated media 996 generally extend in a direction between the end caps 980 and 982. The particular filter arrangement 900 has an outer liner 984, shown broken away at one location, for viewing pleats. Although pleats can typically be viewed through the liner 984, the arrangement 900 shown in FIG. 16 is drawn without showing the pleats through the liner so as to avoid obscuring other features of the arrangement.

Referring back to FIG. 16, the outer liner 984 comprises expanded metal, although a variety of alternative outer liners, including plastic and paper ones, can be used. In some instances, an outer liner is simply not used. For this particular embodiment, a direction perpendicular to the pleat direction is generally a circumference of the filter arrangement 900, indicated by the double headed arrow 988 for the pleats closest to the viewer.

Figure 17:
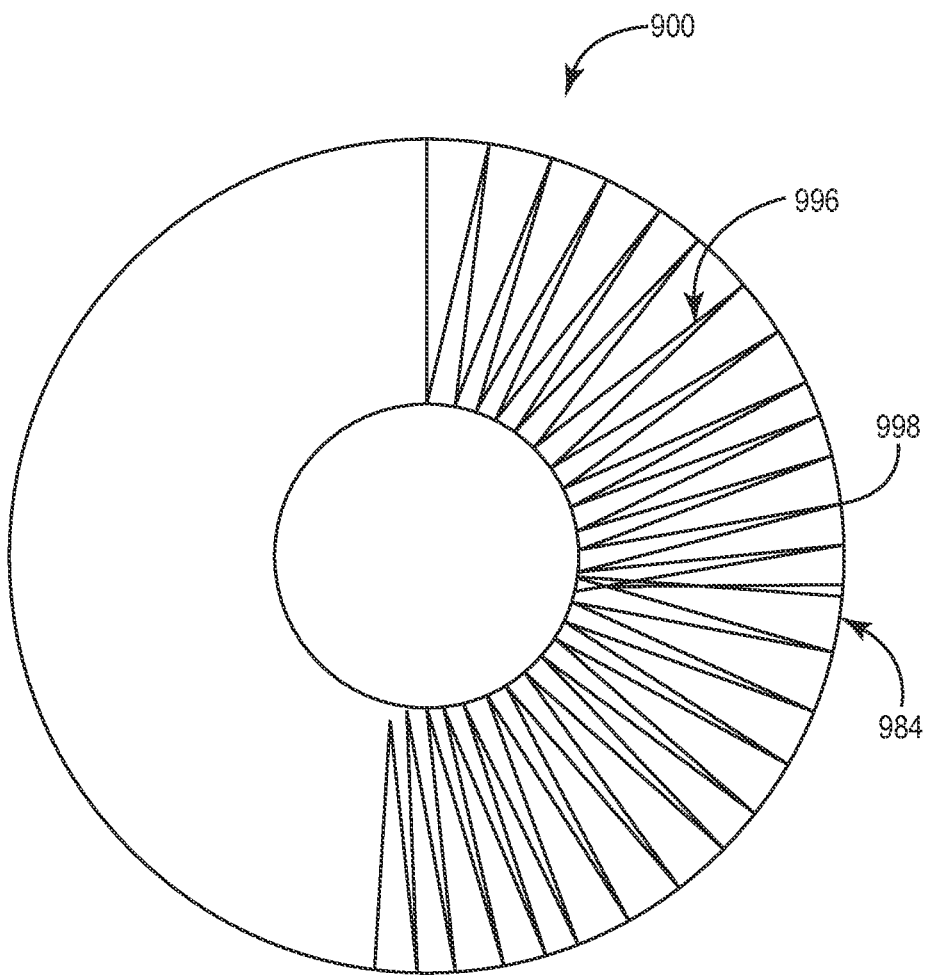
FIG. 17 is a schematic representation of a cross-sectional view of pleated filtration media within the filter element of FIG. 16.

FIG. 17 is a schematic representation of a cross-sectional view of the pleated filtration media 996 within the filter arrangement 900 of FIG. 16. From this view one can see that the filtration media pack 900 is "fanned", which results in the relative separation between the media pleats 998 around the outer liner 984 of the element 900, providing an enhanced area for receiving the dirty air.

Cylindrical filter elements 900 typically have an open end cap, in this instance corresponding to end cap 980, and a closed end cap, in this instance corresponding to end cap 982, although alternatives are possible. The term "open" when used in reference to an end cap, is meant to refer to an end cap which has an open central aperture 992 to allow for air flow between an interior space 986 of the filter arrangement 900 and the exterior of the filter arrangement 900, without passage through the media 996. A closed end cap, by comparison, is an end cap which has no aperture therein.

A variety of arrangements and materials have been developed for end caps 980 and 982. The end caps may comprise polymeric material molded to the media. Alternatively they may comprise metal end caps or other preformed end caps secured to the media, with an appropriate adhesive or potting agent. The particular depicted end caps 980 and 982 are molded end caps, each comprising compressible foamed polyurethane. End cap 980 is shown with a housing seal 994, for sealing the element 900 in a housing during use. The depicted seal 994 is an inside radial seal, although outside radial seals and axial seals are also possible.

Although not visible from this view, projections can be defined in the surface of the filtration media 996 between the outer pleat folds 998 of the pleated media 996 and extending toward the inner volume of the filter element 900.

It is noted that a filter element may include an inner liner 990 extending between end caps 980 and 982 along the inside surface of the media 996, as shown in FIG. 16, although in some arrangements such liners are optional. The inside liner, if used, can be metal, such as expanded metal or perforated metal, or it can be plastic or paper (for example).

An arrangement such as that depicted in FIG. 16 is sometimes referenced herein as a "cylindrical arrangement," using "cylindrically configured" media, or by similar characterizations. Not all filter arrangements that utilize a tubular media are configured as cylinders. An example of this is illustrated in FIG. 18. Referring to FIG. 18, a filter arrangement 1000 comprises an extension of media 1002 which is pleated, with the pleat direction extending in the directions of arrow 1004. Filter arrangement 1000 is somewhat conical, having a wide end 1006 and a narrow end 1008. An end cap 1014 is positioned at the wide end 1006, and another end cap 1010 is positioned at the narrow end 1008. As with the cylindrical arrangement discussed with reference to FIGS. 4 and 5, a variety of open and closed end caps can be used. For the specific example depicted, end cap 1014 is open and end cap 1010 is closed.

Filter arrangement 1000 includes outer support screen 1012 extending between end cap 1014 and 1010. The particular arrangement 1000 includes no inner support screen, although one could be used. The filter element 1000 includes a seal arrangement 1016, in this instance an axial seal, although an inside or outside radial seal is possible. Element 1000 includes a non-continuously threaded mounting arrangement 1018, for mounting a housing. The arrangement 1000 is generally described in detail in PCT/US2003/33952 filed Oct. 23, 2003, incorporated herein by reference in its entirety.

Alternative configurations for media pleat packs and filter elements are possible, such as those taught in published U.S. Patent Application No. 20070209343 entitled "Filter Assembly with Pleated Media Pockets and Methods (Ser. No. 11/683,287), assigned to Donaldson Company Inc., and incorporated herein by reference in its entirety.

The filter elements can be utilized in various housing arrangements, and the filter elements can be replaced or cleaned or refurbished periodically, as desired. Cleaning can comprise, for example, mechanical cleaning, pulse cleaning, or reverse fluid flow cleaning. In the case of air filtration, the housing can be provided as part of an air cleaner for various air cleaning or processing applications including engine air intake, turbine intake, dust collection, and heating and air conditioning. In the case of liquid filtration, the housing can be part of a liquid cleaner for cleaning or processing, for example, water, oil, fuel, and hydraulic fluid.

FIG. 19 shows a portion of a cylindrical filter element 1900 that can be used in a liquid application, such as a filter element for high viscosity liquids. The filter element 1900 can include filter media 1904 and a woven screen 1906. The woven screen 1906 can be bonded or non-bonded to the downstream side of the filter media 1904. The woven screen 1906 can include steel. The woven screen can be configured to provide structural support for the filter media 1904.

The filter element 1900 can include a plurality of projections 1902. In an embodiment, the filter element 1900 only includes projections 1902 on the upstream side of the filter, such as to substantially maintain pleat spacing. In an embodiment, the projections 1902 can include a portion of the filter media 1904 and the woven screen 1906.

In an alternative embodiment, the flow of liquid can go from inside the cylindrical filter element to outside, such that the woven screen can be located on the outer part of the cylinder to be downstream of the filter media. In such an embodiment, the projections can be larger than the apertures in the woven screen, such as to prevent an projection of filter media to pass through the woven screen. In various embodiments, the woven screen and filter material are deformed to form the projections.

Filtration Media

The filtration media can be provided as a relatively flexible media, including a non-woven fibrous material containing cellulose fibers, synthetic fibers, glass fibers, ceramic fibers, or combinations thereof, often including a resin therein, and sometimes treated with additional materials. An example filtration media can be characterized as a cellulosic filtration media that can tolerate about up to twelve percent (12%) strain without tearing when wet and warm, but which will often rupture at lower percent strain when dry and cold (as low as 3% with some media). In an embodiment, the filtration media comprises cellulose. In an embodiment, the fibers forming the filtration media can include at least 25% cellulose, at least 50% cellulose, or at least 75% cellulose. The filtration media can be pleated to form pleated filtration media without unacceptable media degradation. In addition, the filtration media is desirably of a nature such that it will maintain its configuration, during use. While some filtration media is available that can tolerate greater than about twelve percent (12%) strain, and such media can be used according to the invention, such media is typically more expensive because of the need to incorporate relatively large amounts of synthetic fibers.

In an embodiment, the filtration media can be an all synthetic media. In an embodiment, the media can include a synthetic portion and a non-synthetic portion.

In the dimpling or embossing process, a plastic deformation is caused to the media. This prevents the media from returning to its original shape. However, once the forming displacements are released, the projections will sometimes tend to spring partially back, maintaining only a portion of the stretch and bending that has occurred. Also, the media can contain a resin. During the dimpling process, the media can be heated to soften the resin. When the resin cools it helps to maintain the embossed shapes.

In an embodiment, the filter media can have a modulus of elasticity of greater than 10,000 pounds per square inch. In an embodiment, the filtration media can have a modulus of elasticity of less than 75,000 pounds per square inch. In an embodiment, the filter media can have a modulus of elasticity of less than 150,000 pounds per square inch.

The filtration media can be provided with a fine fiber material on one or both sides thereof, for example, in accord with U.S. Pat. Nos. 6,955,775, 6,673,136, and 7,270,693, incorporated herein by reference in their entirety. In general, fine fiber can be referred to as polymer fine fiber (microfiber and nanofiber) and can be provided on the media to improve filtration performance.

The fine fiber can be added at various stages of the manufacturing process. For example, in some implementations the media will contain fine fiber before the projections are formed, while in other implementations the fine fiber is added as a layer or layers to the media. As a result of the presence of fine fiber on the media, it can be possible to provide media having a reduced weight or thickness while obtaining desired filtration properties. Accordingly, the presence of fine fiber on the media can provide enhanced filtration properties, provide for the use of thinner media, or both. Exemplary materials that can be used to form the fine fibers include polyvinylidene chloride, polyvinyl alcohol polymers, polyurethane, and co-polymers comprising various nylons such as nylon 6, nylon 4,6, nylon 6,6, nylon 6,10, and co-polymers thereof, polyvinyl chloride, PVDC, polystyrene, polyacrylonitrile, PMMA, PVDF, polyamides, and mixtures thereof.

In an embodiment for viscous liquid filtration, the filter media bonded to woven steel screen contains at least 25% and preferably 50% polymeric fibers (polyester). The woven steel screen can have 18 strands per inch or a 0.007" diameter strand in the machine direction and 14 strands per inch of a 0.007" diameter strand transverse to the machine direction. The projection size can be at least 2 times or 3 times the largest strand spacing, such as 0.21 inches in this case. The projection height, on the upstream side, in an embodiment will fill the open pleat space to provide positive spacing of each pleat. The projection can be aligned with a neighboring or adjacent projection or staggered. In this case, for a cylindrical filter, the flow would be standard flow, from the outside to the inside of a cylindrical pleated arrangement.

Several techniques can be relied upon for enhancing the performance of pleated filtration media. The technique can be applied to pleated filtration media used in panel filter arrangements and for pleated filtration media used in cylindrical or conical filter arrangements. Depending on whether the pleated filtration media is intended to be used in a panel filter arrangement or a cylindrical or conical filter arrangement, alternative preferences can be provided. In view of this disclosure, one would understand when certain preferences are more desirable for a panel filter arrangement and when certain preferences are more desirable for a cylindrical filter arrangement.

Accordingly, it should be understood that the identification of a preference is not intended to reflect a preference for both panel filter arrangements and cylindrical filter arrangements. Furthermore, it should be understood that the preferences may change as a result of whether the cylindrical filter arrangement is intended to be an arrangement that can be characterized as a forward flow arrangement (where dirty air flows into the filtration media pack from the exterior cylindrical surface) or a reverse flow filtration media pack (where dirty flows into the filtration media pack from the inner surface of the filtration media pack).

Pleat Pack and Filter Element Configurations

Filter elements are also provided according to the invention, the filter elements incorporating media having projections. Filter elements are provided that can include a pleated filtration media pack and a seal arranged relative to the filtration media pack so that fluid to be filtered passes through the filtration media pack as a result of entering in through one face of the media pack and out the other face of the media pack. The seal can be attached directly to the pleated filtration media pack or indirectly via a seal support, and can be provided to engage a housing to provide a seal between the housing and the filter element. The seal can be provided as an axial seal, a radial seal, or a combination axial and radial seal. Crimp seals, pinch seals, and many other forms of seals are also possible.

A filter element or filter cartridge can be provided as a serviceable filter element. The term "serviceable" in this context is meant to refer to a filter element containing filtration media where the filter element can be periodically removed and replaced from a corresponding air cleaner. An air cleaner that includes a serviceable filter element or filter cartridge is constructed to provide for the removal, cleaning, and replacement of the filter element or filter cartridge. In general, the air cleaner can include a housing and an access cover wherein the access cover provides for the removal of a spent filter element and the insertion of a new or cleaned (reconditioned) filter element.

A pleated filtration media pack formed into a panel can be referred to as a "straight through flow configuration" or by variants thereof when the faces on the pleated filtration media are parallel. For example, a filter element provided in the form of a panel generally can have an inlet flow face and an exit flow face, with flow entering and exiting the filter element in generally the same straight through direction. In some instances, each of the faces can be generally flat or planar, with the two parallel to one another. However, variations are possible in some applications, for example non-planar faces.

Alternatively, the inlet and outlet flow faces can be provided at an angle relative to each other so that the faces are not parallel. In addition, a filter element can include a filtration media pack having a non-planar face, and a non-planar face can be considered non-parallel to another face. An exemplary non-planar face for a filtration media pack includes a face that forms the interior surface or the exterior surface of a filtration media pack formed in a cylindrical arrangement or in a conical arrangement. Another exemplary non-planar face for a filtration media pack includes a filtration media pack wherein the media surfaces have an inconsistent or irregular pleat depth (e.g., the pleat depth of one pleat is different from the pleat depth of another pleat). The inlet flow face (sometimes referred to as "end") can be referred to as either the first face or the second face, and the outlet flow face (sometimes referred to as "end") can be referred to as the other of the first face or the second face.

A straight through flow configuration found in filter elements containing pleated filtration media formed into a panel is, for example, in contrast to cylindrical filter elements containing pleated filtration media arranged in a cylindrical configuration of the type shown in U.S. Pat. No. 6,039,778, in which the flow generally makes a substantial turn as its passes through the filter element. That is, in a filter element according to U.S. Pat. No. 6,039,778, the flow enters the cylindrical filter cartridge through a cylindrical side, and then turns to exit through a cylindrical filter end in a forward-flow system. In a reverse-flow system, the flow enters the cylindrical filter cartridge through an end and then turns to exit through a side of the cylindrical filter cartridge. An example of such a reverse-flow system is shown in U.S. Pat. No. 5,613,992. Another type of filter element containing pleated filtration media can be referred to as a conical filter element because the filtration media pack is arranged in a conical form.

In an embodiment, the pleat density or pleat concentration can range from 2 to 20, or from 4 to 18. In an embodiment, the pleat height can be between 0 and 24 inches, such as 1 to 12 inches. In an embodiment, the pleat density can be at least 10 pleats per inch. In an embodiment the pleat density is at least 3 pleats per inch. The approach velocity of fluid approaching the filter can range from 500 ft/min to 2500 ft/min.

In an embodiment, there can be a pleat depth of 0 inches to less than 8 inches. In an embodiment, there can be a pleat depth of 2 inches to less than 8 inches. In an embodiment, there can be a pleat depth of 8 to 16 inches or 8 to 24 inches. In an embodiment, there can be a pleat depth of 0 inches to less than 24 inches.

Media Volume Asymmetry & Cross Sectional Area Asymmetry

A further characteristic of the pleated media of the present invention is the existence of media volume asymmetry in some implementations. Media volume asymmetry occurs when one side of a media pleat pack (either the upstream or downstream side) has a different volume than the other side of the media pleat pack. In some, but not all implementations, the larger media volume corresponds to the upstream open media volume, and the smaller media volume corresponds to the downstream open media volume (during use the upstream volume may accumulate contaminants, such as dust). In various embodiments, such as a radial configuration, asymmetry can be reversed (the downstream volume larger than the upstream volume), such as to reduce the pressure drop in the downstream portion.

Media volume asymmetry is beneficial for various reasons, including improved fluid flow and improved loading performance. In some implementations media will demonstrate a media volume asymmetry of more than 1%, more than 3%, more than 5%, or more than 10%. Example media constructions demonstrate a media volume asymmetry of greater than 15%, greater than 20%, greater than 50%, greater than 75%, greater than 100%, greater than 150%, and greater than 200%. Suitable media volume asymmetry ranges includes, for example, 1% to 300%, 5% to 200%; 50% to 200%; 100% to 200%; and 100% to 150%.

It will be understood that cross-sectional area asymmetry may lead to media volume asymmetry, but this is not always the case because pleated media cross sectional areas can be varied along the length of the filter media so as to have a cumulative effect that the total volume on each side of the media is equal. Also, a given cross section of a media pack may indicate a higher cross-sectional area on an upstream side of the media, but subsequent tapering of the media could cause the overall media volume asymmetry to favor the downstream side in terms of total media volume.

In some embodiments the media pack will have a cross-sectional area asymmetry such that one side of the media has cross sectional area at least 1 percent greater than the opposite side the same piece of media. Often the difference in cross-sectional area across the media will be more than 3%, more than 5%, or more than 10%. Example media constructions demonstrate a media cross sectional area asymmetry of greater than 15%, greater than 20%, greater than 50%, greater than 75%, greater than 100%, greater than 150%, and greater than 200%. Suitable media cross sectional area asymmetry ranges includes, for example, 1% to 300%, 5% to 200%; 50% to 200%; 100% to 200%; and 100% to 150%.

Pleat geometry that results in differences in cross sectional area can significantly impact flow properties through the filter element. Changes in relative cross sectional area of the filter element typically results in changes in the cross sectional area of the upstream and downstream portion of the media pack in that area: If the upstream portion of the media pack undergoes an increase in cross sectional area, then the downstream portion of the media pack will also typically undergo an decrease in cross sectional area. The present invention allows for customization of media volume asymmetry and cross-sectional area asymmetry to improve filter performance.

In one embodiment, when the projections contact other projections the downstream projections have a height of 0.005 inches to 0.050 inches, such as 0.014 inches. The upstream projections have a height of 0 (no projections) to 0.1 inches, such as 0.036 inches. In an embodiment, the upstream projections have a height of 0 to 0.13 inches. In an embodiment, when the projections contact a flat portion of the media the downstream projections have a height of 0.01 inches to 0.1 inches, and the upstream projections have a height of 0 (no projection) to 0.2 inches.

The downstream projections along a pleat have a spacing of 0 inches (continuous) to 1 inch, such as 0.12 inches. The downstream projections across a pleat have a spacing of 0.06 inches to 1 inch. The upstream projection spacing across a pleat is 1 inch. The upstream spacing along a pleat is 1 inch. The radius of the downstream projections can be from 0.02 inches to 0.125 inches, such as 0.04 inches. The radius of the upstream projections can be from 0.03 inches to 0.25 inches, such as 0.06 inches.

EXAMPLES

In some scenarios, the life of a filter element can be limited by the filter element's ability to hold additional contaminants that the filter element has removed from the fluid stream and the overall element pressure drop at a given flow rate that is suitable for the specific application. Deflection of the filter media within a pleat, from the upstream (dirty) side of the pleat to the downstream (clean) side of the pleat causes a narrowing of the downstream exit channel. The narrowing can result in added resistance to the flow and an increase pressure drop across the filter element, in some cases results in a shorten life of the filter element. The projections on the pleats can be configured to at least partially keep the pleat open. The spacing and height of the projections can determine the resistance to deformation for a given application range and media. There can be three or more factors that affect the life of the filter element, such as the modulus of elasticity of the media, the pressure applied, and the media deflection. The modulus of elasticity of the media can be dependent on the type of media, the temperature, and the moisture content. The pressure applied indicates the maximum pressure applied to the media within a pleat, at the maximum flow rate for a given application. The pressure applied can be dependent on the flow rate, pleat concentration, loading state, and media permeability. At a maximum pleat concentration, such as when the projections are touching, $C_{pleat}$ can be proportional to $h_{ProjectionUpstream}$, $h_{ProjectionDownstream}$, and $t_{media}$, where $C_{pleat}$ is the concentration, h is a height and t is a thickness. The loading state can refer to both the amount of contaminants, such as dust, loaded on the media, and the contaminant cake permeability.

A projection pattern can have spacing define herein as gap across pleat spacing and gap along pleat spacing, where along signifies the machine direction (along the pleat from tip to valley) and across signifies the cross matching direction (across the pleat length). The gap can refer to the distance from the edge of one projection to the edge of an adjacent projection.

In an application, such as for on road engine use, the flow rate can be between 300 CFM and 800 CFM, the pleat concentration can be between 4 pleats/inch and 14 pleats/inch, the media can include cellulose or cellulose and nanofiber, and the modulus can be between 10,000 psi and 200,000 psi.

In an application, such as for off road engine use, the flow rate can be between 120 CFM and 1200 CFM, the pleat concentration can be between 4 pleats/inch and 14 pleats/inch, the media can include cellulose or cellulose and nanofiber, and the modulus can be between 10,000 psi and 200,000 psi.

In an application, such as for gas turbine use, the flow rate can be between 1000 CFM and 2500 CFM, the pleat concentration can be between 2 pleats/inch and 12 pleats/inch, the media can include a synthetic, cellulose and a synthetic, or cellulose, synthetic and nanofiber, and the modulus can be between 10,000 psi and 200,000 psi.

In an application, such as for an industrial air use, the flow rate can be between 450 CFM and 1200 CFM, the pleat concentration can be between 2 pleats/inch and 12 pleats/inch, the media can include a synthetic, cellulose and a synthetic, or cellulose, synthetic and nanofiber, and the modulus can be between 10,000 psi and 200,000 psi.

The range of media modulus of elasticity for a dry, room temperature media can be from 30,000 psi to 150,000 psi. The modulus of elasticity generally can decrease with increasing temperature and moisture content, and may decrease below 30,000 psi in extreme conditions.

In an embodiment, such as for on road engine use, the following ranges for variables can be present.

|  | Flow · CFM | PleatCon · ppi | Pinit · inH2O | Emod · PSI | Pterminal · inH2O |
|---|---|---|---|---|---|
| Min | 300 | 4 | 0.5 | 10000 | 20 |
| Max | 800 | 14 | 8 | 2.E+05 | 30 |

In such an embodiment, the downstream dimple spacing along the depth of the pleat can be from 0.1 inches to 0.422 inches. The downstream dimple spacing across the span of the pleat can be from 0.1 inches to 0.542 inches. The downstream dimple height can be from 0.01 inches to 0.062 inches.

In an embodiment, such as for off road engine use, the following ranges for variables can be present.

|  | Flow · CFM | PleatCon · ppi | Pinit · inH2O | Emod · PSI | Pterminal · inH2O |
|---|---|---|---|---|---|
| Min | 120 | 4 | 0.5 | 10000 | 20 |
| Max | 1200 | 14 | 8 | 2.E+05 | 30 |

In such an embodiment, the downstream dimple spacing along the depth of the pleat can be from 0.1 inches to 0.477 inches. The downstream dimple spacing across the span of the pleat can be from 0.1 inches to 0.546 inches. The downstream dimple height can be from 0.01 inches to 0.055 inches.

In an embodiment, such as use with a gas turbine system, the following ranges for variables can be present.

|  | Flow · CFM | PleatCon · ppi | Pinit · inH2O | Emod · PSI | Pterminal · inH2O |
|---|---|---|---|---|---|
| Min | 1000 | 2 | 0.25 | 10000 | 3 |
| Max | 2500 | 12 | 2 | 2.E+05 | 5 |

In such an embodiment, the downstream dimple spacing along the depth of the pleat can be from 0.1 inches to 0.75 inches. The downstream dimple spacing across the span of the pleat can be from 0.1 inches to 0.75 inches. The downstream dimple height can be from 0.01 inches to 0.074 inches.

In an embodiment, such as for use in industrial air filtration, the following ranges for variables can be present.

|     | Flow · CFM | PleatCon · ppi | Pinit · inH2O | Emod · PSI | Pterminal · inH2O |
| --- | --- | --- | --- | --- | --- |
| Min | 450 | 2 | 0.25 | 10000 | 3 |
| Max | 1200 | 12 | 5 | 2.E+05 | 8 |

In such an embodiment, the downstream dimple spacing along the depth of the pleat can be from 0.1 inches to 0.775 inches. The downstream dimple spacing across the span of the pleat can be from 0.1 inches to 0.775 inches. The downstream dimple height can be from 0.01 inches to 0.015 inches.

The above specification provides a complete description of the present invention. Since many embodiments of the invention can be made without departing from the spirit and scope of the invention, the invention resides in the claims hereinafter appended.

We claim:

1. A pleated filter element containing a plurality of media pleats, the media pleats comprising:
    a) filter media configured for filtration of fluids, the filter media containing a first face and a second face;
    b) a plurality of embossed upstream projections of substantially the same height and the same length extending from a first face of the filter media; the upstream projections being substantially evenly spaced from one another along the first face of the filter media, the embossed upstream projections formed by a plastic deformation to the media;
    c) a plurality of embossed downstream projections of substantially the same height and the same length extending from a second face of the filter media, the downstream projections being substantially evenly spaced from one another along the first face of the filter media, the embossed downstream projections formed by a plastic deformation to the media;
    wherein the upstream projections are spaced from 0.5 inches to 1.5 inches from upstream projection edge to upstream projection edge;
    wherein the downstream projections are spaced from 0.06 inches to 1.0 inch from downstream projection edge to downstream projection edge;
    wherein the upstream projections are spaced farther apart from one another than the downstream projections are spaced from one another;
    wherein the upstream projections have a height of 0.01 inches to 0.1 inches; and the average upstream projection height is at least 50 percent greater than the average downstream projection height; and
    wherein the first face and the second face are substantially uniformly spaced from one another.

2. The pleated filter element of claim 1, wherein the pleat depth is from greater than 0 inches to less than 8 inches.

3. The pleated filter element of claim 1, wherein there are more downstream projections than upstream projections.

4. The pleated filter element of claim 1, wherein the projections are substantially round.

5. The pleated filter element of claim 1, wherein the projections are arranged in a substantially equilateral triangle configuration.

6. The pleated filter element of claim 1, wherein the filter media has a modulus of elasticity greater than 10,000 pounds per square inch.

7. The pleated filter element of claim 1, wherein the filter media has a modulus of elasticity less than 75,000 pounds per square inch.

8. A pleated filter element containing a plurality of media pleats, the media pleats comprising:
    a) filter media configured for filtration of fluids, the filter media containing a first face and a second face;
    b) a plurality of embossed downstream projections of substantially the same height and the same length, the projections extending from at least one face of the filter media and a plurality of embossed upstream projections of substantially the same height and the same length, the projections extending from the opposite face of the filter media, the embossed projections formed by a plastic deformation to the media;
    wherein the downstream projections are spaced from 0.06 inches to 1.0 inch from downstream projection edge to downstream projection edge and the downstream projections being substantially evenly spaced from one another along the first face of the filter media;
    wherein the downstream projections have a height of .005 inches to 0.050 inches;
    wherein the upstream projections are arranged in a substantially triangular configuration, the upstream projections being substantially evenly spaced from one another along the first face of the filter media; and
    wherein the pleat concentration is at least 3 pleats per inch;
    wherein the upstream projections are spaced farther apart from one another than the downstream projections are spaced from one another;
    the average upstream projection height is at least 50 percent greater than the average downstream projection height; and
    wherein the first face and the second face are substantially uniformly spaced from one another.

9. The pleated filter element of claim 8, wherein the upstream projections are spaced from 0.5 inches to 1.5 inches from upstream projection edge to upstream projection edge.

10. The pleated filter element of claim 8, wherein the upstream projections have a height of 0.01 inches to 0.1 inches.

11. The pleated filter element of claim 8, wherein the downstream projections are arranged in a substantially equilateral triangular configuration.

12. The pleated filter element of claim 8, wherein at least a portion of the plurality of downstream projections are bonded to other downstream projections.

13. A pleated filter element containing a plurality of media pleats, the media pleats comprising:
    a) filter media configured for filtration of fluids, the filter media containing a first face and a second face;
    b) a plurality of embossed substantially circular upstream projections of substantially the same height and the same length, the projections extending from at least one face of the filter media, the upstream projections being substantially evenly spaced from one another along the first face of the filter media, the embossed upstream projections formed by a plastic deformation to the media;
    c) a plurality of embossed substantially circular downstream projections of substantially the same height and the same length, the projections extending from at least one face of the filter media, the downstream projections being substantially evenly spaced from one another along the first face of the filter media, the embossed downstream projections formed by a plastic deformation to the media;

wherein the downstream projections have a radius from 0.02 inches to 0.125 inches;

wherein the downstream projections have a height of .005 inches to 0.050 inches;

wherein the downstream projections are spaced from 0.06 inches to 1.0 inch from downstream projection edge to downstream projection edge;

wherein the upstream projections are spaced farther apart from one another than the downstream projections are spaced from one another;

the average upstream projection height is at least 50 percent greater than the average downstream projection height; and wherein the first face and the second face are substantially uniformly spaced from one another.

14. The pleated filter element of claim 13, wherein the upstream projections have a radius from 0.03 inches to 0.25 inches.

15. The pleated filter element of claim 13, wherein the upstream projections are spaced from 0.5 inches to 1.5 inches from upstream projection edge to upstream projection edge.

16. The pleated filter element of claim 13, wherein the downstream projections are arranged in a substantially equilateral triangular configuration.

17. The pleated filter element of claim 13, wherein the filter media has a modulus of elasticity greater than 30,000 pounds per square inch and less than 150,000 pound per square inch.

* * * * *